(12) United States Patent
Abe et al.

(10) Patent No.: US 10,486,462 B2
(45) Date of Patent: Nov. 26, 2019

(54) NON-PNEUMATIC TIRE

(71) Applicant: BRIDGESTONE CORPORATION, Tokyo (JP)

(72) Inventors: Akihiko Abe, Tokyo (JP); Masashi Nishida, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 430 days.

(21) Appl. No.: 15/320,126

(22) PCT Filed: Jun. 24, 2014

(86) PCT No.: PCT/JP2014/066640
§ 371 (c)(1),
(2) Date: Dec. 19, 2016

(87) PCT Pub. No.: WO2015/198387
PCT Pub. Date: Dec. 30, 2015

(65) Prior Publication Data
US 2017/0136814 A1 May 18, 2017

(51) Int. Cl.
*B60B 9/04* (2006.01)
*B60C 7/18* (2006.01)
(Continued)

(52) U.S. Cl.
CPC .................. *B60B 9/04* (2013.01); *B60B 9/26* (2013.01); *B60C 7/14* (2013.01); *B60C 7/18* (2013.01);
(Continued)

(58) Field of Classification Search
CPC ........... B60B 9/04; B60B 9/26; B60C 11/005; B60C 11/0083; B60C 7/14; B60C 7/18; B60C 2007/146
(Continued)

(56) References Cited

U.S. PATENT DOCUMENTS 4,295,686 A 10/1981 Black
4,784,201 A 11/1988 Palinkas et al.
(Continued)

FOREIGN PATENT DOCUMENTS

CN 102791496 A 11/2012
JP 021385 C 1/1912
(Continued)

OTHER PUBLICATIONS

Communication dated May 30, 2018, from the State Intellectual Property Office of People's Republic of China in counterpart Application No. 201480080040.X.
(Continued)

*Primary Examiner* — S. Joseph Morano
*Assistant Examiner* — Jean W Charleston
(74) *Attorney, Agent, or Firm* — Sughrue Mion, PLLC

(57) ABSTRACT

A non-pneumatic tire (11), includes: a mount body (111) that is mounted on a shaft (S); an outer cylindrical body (113) encircling the mount body from outside thereof in a radial direction of the tire; connecting members (115) arranged in a circumferential direction of the tire therebetween and connecting the mount body and the outer cylindrical body such that the mount body and the outer cylindrical body are resiliently movable relative to each other; and a cylindrical tread portion (116) encircling the outer cylindrical body from outside thereof in the radial direction of the tire. In addition, the outline of a cross-section of an outer surface (116c) of a central area (129) of the tread portion taken in a width direction of the tire is a curved line bulging outward in the radial direction of the tire, and the central area includes at least a tire equator (E).

8 Claims, 10 Drawing Sheets

(51) Int. Cl.
*B60B 9/26* (2006.01)
*B60C 7/14* (2006.01)
*B60C 11/00* (2006.01)

(52) U.S. Cl.
CPC ........ *B60C 11/005* (2013.01); *B60C 11/0083* (2013.01); *B60C 2007/146* (2013.01)

(58) Field of Classification Search
USPC .......................................................... 152/80
See application file for complete search history.

(56) References Cited

U.S. PATENT DOCUMENTS

| | | |
|---|---|---|
| 2010/0230022 A1 | 9/2010 | Kim |
| 2011/0024008 A1 | 2/2011 | Manesh et al. |
| 2011/0290394 A1 | 12/2011 | Luchini et al. |
| 2012/0038207 A1 | 2/2012 | Williams et al. |
| 2012/0318417 A1 | 12/2012 | Dotson et al. |
| 2015/0136290 A1 | 5/2015 | Kim |
| 2015/0251492 A1* | 9/2015 | Fudemoto ................. B60C 7/14 152/80 |
| 2015/0258853 A1* | 9/2015 | Fudemoto ................. B60C 7/14 152/80 |
| 2015/0273945 A1* | 10/2015 | Fudemoto ................. B60B 9/04 152/316 |
| 2015/0273946 A1 | 10/2015 | Abe et al. |
| 2016/0297244 A1 | 10/2016 | Abe |

FOREIGN PATENT DOCUMENTS

| | | | |
|---|---|---|---|
| JP | 08-014951 Y | | 10/1933 |
| JP | 114807 C | | 11/1935 |
| JP | 33-18103 Y1 | | 11/1958 |
| JP | 2006-168602 A | | 6/2006 |
| JP | 2011-156905 A | | 8/2011 |
| JP | 2011-246050 A | | 12/2011 |
| JP | 2013-18427 A | | 1/2013 |
| JP | 2013-18462 A | | 1/2013 |
| JP | 2013018427 A | * | 1/2013 |
| JP | 2013-71652 A | | 4/2013 |
| JP | 2013071652 A | * | 4/2013 |
| JP | 2014-8952 A | | 1/2014 |
| JP | 2014091453 A | | 5/2014 |
| JP | 2014-100933 A | | 6/2014 |
| JP | 2014-118128 A | | 6/2014 |
| KR | 10-1252035 B1 | | 6/2013 |
| WO | 2010/007636 A1 | | 1/2010 |
| WO | 2014/069653 A1 | | 5/2014 |
| WO | WO-2014069653 A1 | * | 5/2014 ............... B60C 7/18 |
| WO | 2015/072312 A1 | | 5/2015 |

OTHER PUBLICATIONS

International Search Report of PCT/JP2014/066640, dated Sep. 30, 2014. [PCT/ISA/210].
Notice of Reasons for Rejection for Japanese Patent Application No. 2012-277414, dated Jun. 7, 2016.
Communication dated Jul. 17, 2017, issued by the European Patent Office in counterpart application No. 14895799.6.

* cited by examiner

NON-PNEUMATIC TIRE

CROSS REFERENCE TO RELATED APPLICATIONS

This application is a National Stage of International Application No. PCT/JP2014/066640 filed Jun. 24, 2014, the contents of all of which are incorporated herein by reference in their entirety.

TECHNICAL FIELD

The present invention relates to a non-pneumatic tire in which it is unnecessary to fill the inside thereof with pressurized air at the time of use.

BACKGROUND ART

In a conventional pneumatic tire that is used in a state where the inside of the tire is filled with pressurized air, occurrence of a puncture of the tire is a structurally inevitable problem.

In order to solve this problem, in recent years, a non-pneumatic tire as shown in, for example, Patent Document 1 has been proposed. The non-pneumatic tire includes a mount body that is mounted on an axle, an outer cylindrical body (a ring-shaped body) encircling the mount body, and connecting members arranged in the circumferential direction of the tire between the mount body and the outer cylindrical body.

DOCUMENT OF RELATED ART

Patent Document

[Patent Document 1] Japanese Unexamined Patent Application, First Publication No. 2011-156905

SUMMARY OF INVENTION

Technical Problem

In a conventional non-pneumatic tire, for example, in order to mount the tire on a two-wheeled vehicle or to mount the tire on a vehicle with a camber angle, a tread portion (a tread member) may be employed in which the outer circumferential surface of the tread portion is formed into a curved surface whose cross-section taken in the width direction of the tire bulges outward in the radial direction of the tire and in which the outer diameter of the tread portion gradually decreases from a maximum outer diameter part of the tread portion to each of two ends of the tread portion in the width direction of the tire between which the maximum outer diameter part is disposed. In this case, the thickness of the maximum outer diameter part of the tread portion in the radial direction of the tire may significantly increase compared to that of another part of the tread portion, and thus the maneuverability of the vehicle may deteriorate.

That is, it is possible to further study the shape of the tread portion of a conventional non-pneumatic tire, and particularly, it is desired to improve the ground contact performance of the tire when the tire inclines relative to road surface (namely, when a camber angle is provided in the tire).

The present invention has been made in view of the above circumstances, and an object of the present invention is to provide a non-pneumatic tire that can prevent deterioration of the vehicle maneuverability even when employing a tread portion in which the outer circumferential surface of the tread portion is formed into a curved surface whose cross-section taken in the width direction of the tire bulges outward in the radial direction of the tire and in which the outer diameter of the tread portion gradually decreases from a maximum outer diameter part of the tread portion to each of two ends of the tread portion in the width direction of the tire between which the maximum outer diameter part is disposed.

In addition, an object of the present invention is to provide a non-pneumatic tire that can improve the ground contact performance of the tire with respect to road surface.

Solution to Problem

A first aspect of the present invention is a non-pneumatic tire, including: a mount body that is mounted on a shaft; an outer cylindrical body encircling the mount body from outside of the mount body in a radial direction of the tire; connecting members arranged in a circumferential direction of the tire between the mount body and the outer cylindrical body and connecting the mount body and the outer cylindrical body such that the mount body and the outer cylindrical body are resiliently movable relative to each other; and a cylindrical tread portion encircling the outer cylindrical body from outside of the outer cylindrical body in the radial direction of the tire. In addition, the outline of a cross-section of an outer surface of a central area of the tread portion taken in a width direction of the tire is a curved line bulging outward in the radial direction of the tire, and the central area includes at least a tire equator.

According to the first aspect of the present invention, at least part of the outer surface of the tread portion appropriately contacts road surface in accordance with the camber angle of the tire, and thus the ground contact performance of the tire can be improved compared to that of a conventional non-pneumatic tire in which the outer surface of the tread portion thereof is flat.

A second aspect of the present invention is that in the non-pneumatic tire of the first aspect, an outer circumferential surface of the tread portion is formed into a curved surface whose cross-section taken in the width direction of the tire bulges outward in the radial direction of the tire. The outer diameter of the tread portion gradually decreases from a maximum outer diameter part of the tread portion to each of two ends of the tread portion in the width direction of the tire between which the maximum outer diameter part is disposed. In addition, the thickness of the central area of the tread portion in the radial direction of the tire is greater than the thickness of a shoulder part of the tread portion positioned outside of the central area in the width direction of the tire.

According to the second aspect of the present invention, since the thickness of the central area of the tread portion that is liable to wear during straight running is increased, the wear life of the tire can be improved.

A third aspect of the present invention is that in the non-pneumatic tire of the second aspect, the outer diameter of the outer cylindrical body becomes the maximum at the same position as the maximum outer diameter part of the tread portion in the width direction of the tire and gradually decreases from the position to each of two ends of the outer cylindrical body in the width direction of the tire between which the position is disposed.

According to the third aspect of the present invention, the tread portion attached to the outer cylindrical body and having the above-described outer circumferential surface can be obtained without significantly increasing the thickness of the maximum outer diameter part of the tread portion in the radial direction of the tire. That is, since the outer circumferential surface of the outer cylindrical body has a shape similar to that of the outer circumferential surface of the tread portion, the distance between these outer circumferential surfaces, namely the thickness of the tread portion, can be limited from varying at positions in the width direction of the tire. Thus, it is possible to prevent the rigidity of the maximum outer diameter part of the tread portion from significantly decreasing compared to that of another part thereof and to obtain appropriate vehicle maneuverability.

A fourth aspect of the present invention is that in the non-pneumatic tire of the third aspect, the thickness of the outer cylindrical body in the radial direction of the tire gradually increases toward a maximum outer diameter part of the outer cylindrical body in the width direction of the tire. In addition, the connecting members are connected to positions of the outer cylindrical body different from the maximum outer diameter part of the outer cylindrical body in the width direction of the tire.

According to the fourth aspect of the present invention, it is possible to limit the rigidity of the outer cylindrical body from varying at positions in the width direction of the tire and to reliably obtain appropriate vehicle maneuverability.

A fifth aspect of the present invention is that in the non-pneumatic tire of the third or fourth aspect, the outer cylindrical body is divided in the width direction of the tire at the maximum outer diameter part having the maximum diameter of the outer cylindrical body. The thickness of the outer cylindrical body in the radial direction of the tire gradually increases toward a divided part of the outer cylindrical body in the width direction of the tire. In addition, two division surfaces at the divided part are connected to each other.

According to the fifth aspect of the present invention, since the outer cylindrical body is divided into two parts in the width direction of the tire, the outer cylindrical body can be easily formed even if the outer cylindrical body has, for example, a complex structure.

In addition, since the thickness of each of two divided cylindrical bodies in the radial direction of the tire, the divided cylindrical bodies configuring the outer cylindrical body, gradually increases toward a division surface in the width direction of the tire, each division surface can have a large area, and thus the division surfaces of the divided cylindrical bodies can be firmly connected to each other.

A sixth aspect of the present invention is that in the non-pneumatic tire of any one of the first to fifth aspects, the outer cylindrical body is divided into a first cylindrical body and a second cylindrical body, the first cylindrical body is positioned to be close to a first area next to the tire in the width direction of the tire, and the second cylindrical body is positioned to be close to a second area next to the tire opposite to the first area in the width direction of the tire. In addition, the thickness of a joined part in the radial direction of the tire, the joined part being between the first and second cylindrical bodies, is greater than the average thickness of the outer cylindrical body in the radial direction of the tire.

According to the sixth aspect of the present invention, when the contact area through which the first and second cylindrical bodies are joined together is increased, the joining strength thereof can be improved. In this case, the phrase "the thickness of a joined part in the radial direction of the tire, the joined part being between the first and second cylindrical bodies" denotes the length of end surfaces in the radial direction of the tire, and the end surfaces are positioned at the ends of the first and second cylindrical bodies in the width direction of the tire and contact each other.

A seventh aspect of the present invention is that in the non-pneumatic tire of any one of the first to sixth aspects, a connecting member of the connecting members includes a first connecting member and a second connecting member that are disposed to be separated from each other in the width direction of the tire. In addition, the thickness of the outer cylindrical body in the radial direction of the tire within a tire width-direction area that is between the first and second connecting members is greater than the average thickness of the outer cylindrical body in the radial direction of the tire.

According to the seventh aspect of the present invention, the outer cylindrical body within the tire width-direction area in which the connecting members are not disposed can have an appropriate rigidity, and thus the steering stability can be improved.

A eighth aspect of the present invention is that in the non-pneumatic tire of the sixth or seventh aspect, the thickness of at least part of the outer cylindrical body in the radial direction of the tire gradually increases toward the center of the outer cylindrical body in the width direction of the tire.

According to the eighth aspect of the present invention, both of attachment with ease of the tread portion to the outer cylindrical body and prevention of detachment of the tread portion from the outer cylindrical body during running on road surface can be obtained.

A ninth aspect of the present invention is that in the non-pneumatic tire of any one of the first to eighth aspects, the outer cylindrical body includes an outer cylindrical main body and a projecting portion projecting outward in the radial direction of the tire from the outer cylindrical main body. In addition, the projecting portion includes a base part connecting to the outer cylindrical main body and an enlarged part whose cross-section taken in the width direction of the tire has a greater width than the width of the base part in the width direction of the tire.

According to the ninth aspect of the present invention, the tread portion is engaged with the projecting portion of the outer cylindrical body, and thus it is possible to reliably prevent the tread portion from being broken off the outer cylindrical body.

Effects of Invention

According to the present invention, it is possible to prevent deterioration of the vehicle maneuverability even when a tread portion is employed in which the outer circumferential surface of the tread portion is formed into a curved surface whose cross-section taken in the width direction of a tire bulges outward in the radial direction of the tire and in which the outer diameter of the tread portion gradually decreases from a maximum outer diameter part of the tread portion to each of two ends of the tread portion in the width direction of the tire between which the maximum outer diameter part is disposed.

In addition, according to the present invention, it is possible to provide a non-pneumatic tire having improved ground contact performance with respect to road surface.

DESCRIPTION OF EMBODIMENTS

Hereinafter, a first embodiment of a non-pneumatic tire of the present invention is described with reference to FIGS. 1 to 5. A non-pneumatic tire 11 of this embodiment may be employed for, for example, a small-sized vehicle that runs at a low speed such as a handle-type electric wheelchair provided in JIS T 9208. In addition, the size of the non-pneumatic tire 11 of this embodiment may be set to, for example, 3.00-8.

Figure 1:
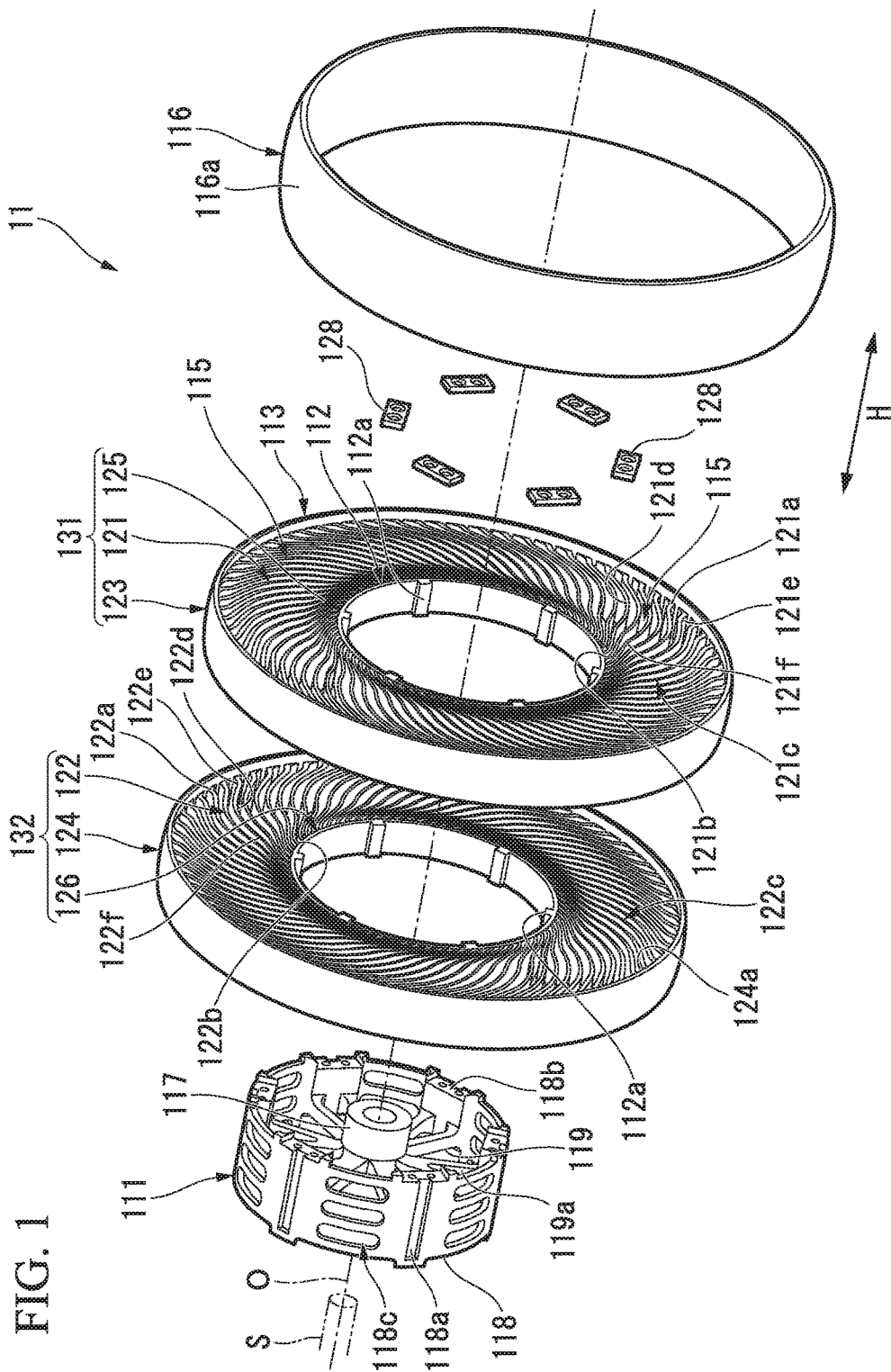
FIG. 1 is a schematic perspective view of a non-pneumatic tire of a first embodiment of the present invention in which parts of the tire are exploded.
Figure 2:
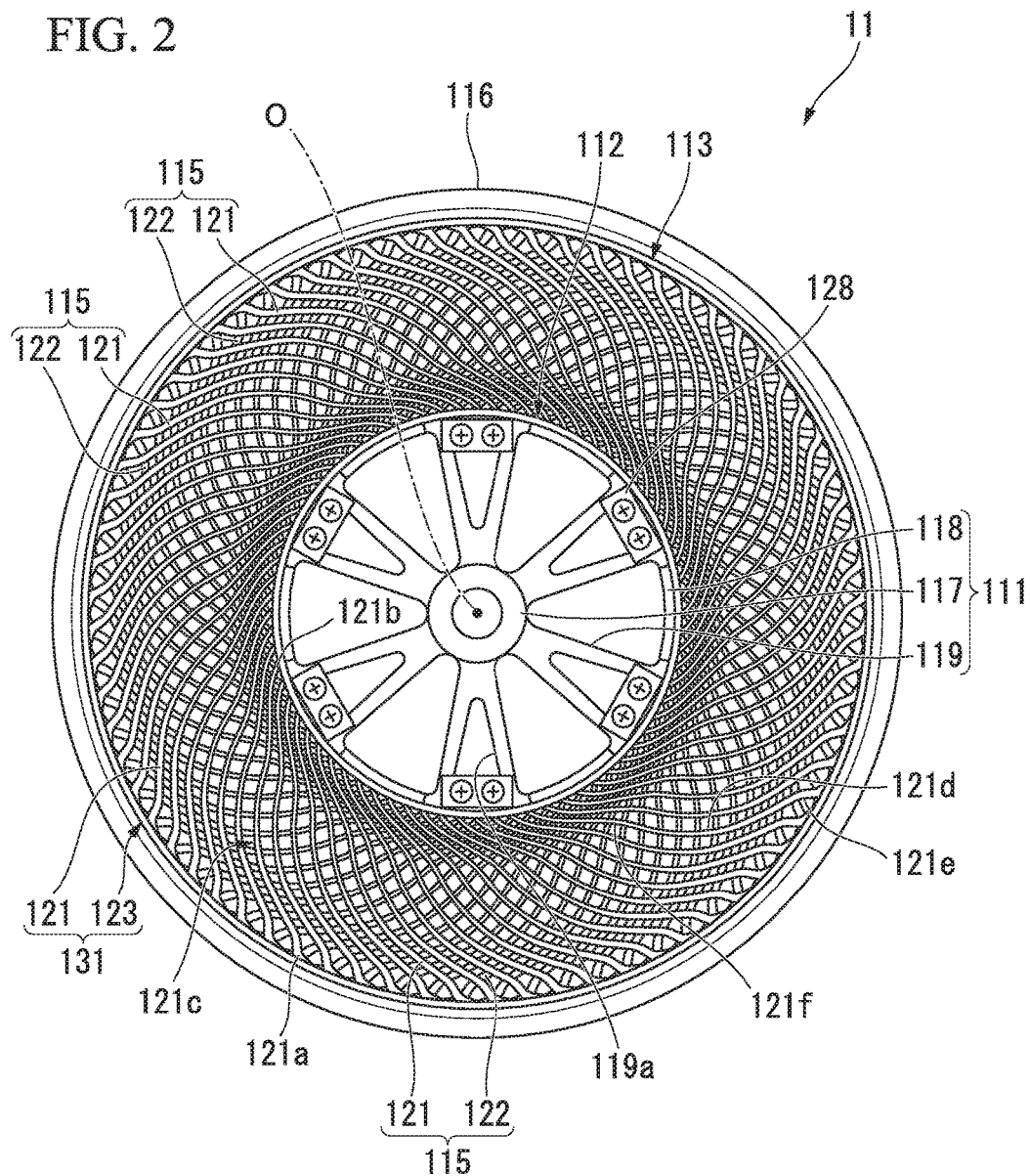
FIG. 2 is a side view of the non-pneumatic tire shown in FIG. 1 taken from a first area next to the tire in the width direction of the tire.

As shown in FIGS. 1 and 2, the non-pneumatic tire 11 of this embodiment includes a mount body 111 that is mounted on an axle S (a shaft), a ring-shaped body 113 (an outer cylindrical body) encircling the mount body 111 from outside of the mount body 111 in the radial direction of the tire, connecting members 115 arranged in the circumferential direction of the tire between the mount body 111 and the ring-shaped body 113 and connecting the mount body 111 and the ring-shaped body 113 such that the mount body 111 and the ring-shaped body 113 are resiliently movable relative to each other, and a cylindrical tread member 116 (a tread portion) attached to the outside of the ring-shaped body 113.

The mount body 111, the ring-shaped body 113 and the tread member 116 are arranged coaxially with a common axis. Hereinafter, the common axis is referred to as an axial line O, a direction parallel to the axial line O is referred to as a tire width direction H, a direction orthogonal to the axial line O is referred to as a tire radial direction, and a direction around the axial line O is referred to as a tire circumferential direction. The mount body 111, the ring-shaped body 113 and the tread member 116 are arranged such that the positions of the centers thereof in the tire width direction H are the same in the tire width direction H.

The mount body 111 includes a mount cylindrical portion 117 that is mounted on the end of the axle S, an outer ring portion 118 encircling the mount cylindrical portion 117 from outside of the mount cylindrical portion 117 in the tire radial direction, and ribs 119 connecting the mount cylindrical portion 117 and the outer ring portion 118 to each other.

The mount cylindrical portion 117, the outer ring portion 118 and the ribs 119 are integrally formed of a metal material such as aluminum alloy. The mount cylindrical portion 117 and the outer ring portion 118 are formed into cylindrical shapes and are arranged coaxially with the axial line O. The ribs 119 are arranged at regular intervals in the tire circumferential direction.

The outer circumferential surface of the outer ring portion 118 is provided with key grooves 118a at intervals in the tire circumferential direction, and the key grooves 118a are depressed inward of the outer ring portion 118 in the tire radial direction and extend in the tire width direction H. On the outer circumferential surface of the outer ring portion 118, one of two ends of the key groove 118a close to a first area next to the tire in the tire width direction H opens, and the other of the two ends thereof close to a second area next to the tire opposite to the first area in the tire width direction H closes.

Part of the outer ring portion 118 positioned between two key grooves 118a next to each other in the tire circumferential direction is provided with a hole row 118c in which wall though-holes penetrating the outer ring portion 118 in the tire radial direction are disposed at intervals in the tire width direction H. The rib 119 is also provided with a wall through-hole 119a penetrating the rib 119 in the tire width direction H.

An edge of the outer ring portion 118 close to the first area next to the tire in the tire width direction H is provided with recesses 118b, and the recesses 118b are disposed at positions corresponding to the openings of the key grooves 118a, are depressed toward the second area next to the tire in the tire width direction H and are fitted with plates 128. The plate 128 is provided with through-holes. A bottom wall surface of the wall surfaces forming the recess 118b facing the first area next to the tire in the tire width direction H is provided with female-threaded portions that communicate with the through-holes of the plate 128 fitted into the recess 118b. The female-threaded portions are formed at intervals in the tire circumferential direction, and the through-holes are also formed at intervals in the tire circumferential direction.

The outside of the mount body 111 is fitted with a cylindrical outer attachment body 112. The inner circumferential surface of the outer attachment body 112 is provided with ridges 112a at intervals in the tire circumferential direction, and the ridges 112a project inward of the outer attachment body 112 in the tire radial direction and extend on the entire length of the outer attachment body 112 in the tire width direction H. The ridges 112a are fitted into the key grooves 118a of the mount body 111.

The outer attachment body 112 is fixed to the mount body 111 by fixing the plates 128 into the recesses 118b in a state where the ridges 112a are fitted into the key grooves 118a.

A pair of side wall surfaces facing each other in the tire circumferential direction and a bottom wall surface of the wall surfaces forming the key groove 118a contact each other at right angles. A pair of side wall surfaces erecting from the inner circumferential surface of the outer attachment body 112 and a top wall surface facing the inner area of the outer attachment body 112 in the tire radial direction contact each other at right angles. The sizes (widths) of the ridge 112a and the key groove 118a in the tire circumferential direction are approximately the same.

The size in the tire width direction H, namely the width, of the ring-shaped body 113 is greater than that of the outer attachment body 112, and in the example shown in the drawings, the ring-shaped body 113 is formed into a cylindrical shape.

The connecting members 115 connect the outer circumferential surface of the mount body 111 and the inner circumferential surface of the ring-shaped body 113. In the example shown in the drawings, the connecting member 115 includes a first connecting plate 121 (a first connecting member) and a second connecting plate 122 (a second connecting member) that are resiliently deformable, and each of the first and second connecting plates 121 and 122 connects the outer circumferential surface of the outer attachment body 112 and the inner circumferential surface of the ring-shaped body 113.

In the connecting members 115, the first connecting plates 121 are arranged in the tire circumferential direction in a first position (a position close to the first area next to the tire 11 in the tire width direction H) in the tire width direction H, and the second connecting plates 122 are arranged in the tire circumferential direction in a second position (a position close to the second area next to the tire 11 in the tire width direction H) different from the first position in the tire width direction H. That is, the first connecting plates 121 are arranged in the tire circumferential direction in the same position in the tire width direction H, and the second connecting plates 122 are arranged in the tire circumferential direction in the same position in the tire width direction H disposed apart from the first connecting plates 121 in the tire width direction H. In the example shown in the drawings, sixty first connecting plates 121 and sixty second connecting plates 122 are provided in the tire circumferential direction.

The connecting members 115 are arranged between the outer attachment body 112 and the ring-shaped body 113 in positions being in rotational symmetry (point symmetry) around the axial line O. All of the connecting members 115 have the same shape and size. The width of the connecting member 115 is less than that of the ring-shaped body 113.

In a state where no compressive load is added to the tire in the tire radial direction, two first connecting plates 121 next to each other in the tire circumferential direction do not contact each other. Similarly, in a state where no compressive load is added to the tire in the tire radial direction, two second connecting plates 122 next to each other in the tire circumferential direction do also not contact each other. The first and second connecting plates 121 and 122 next to each other in the tire width direction H do not contact each other regardless of a load added to the tire 11.

The widths of the first and second connecting plates 121 and 122 are approximately the same. The thicknesses of the first and second connecting plates 121 and 122 are also approximately the same.

Figure 3:
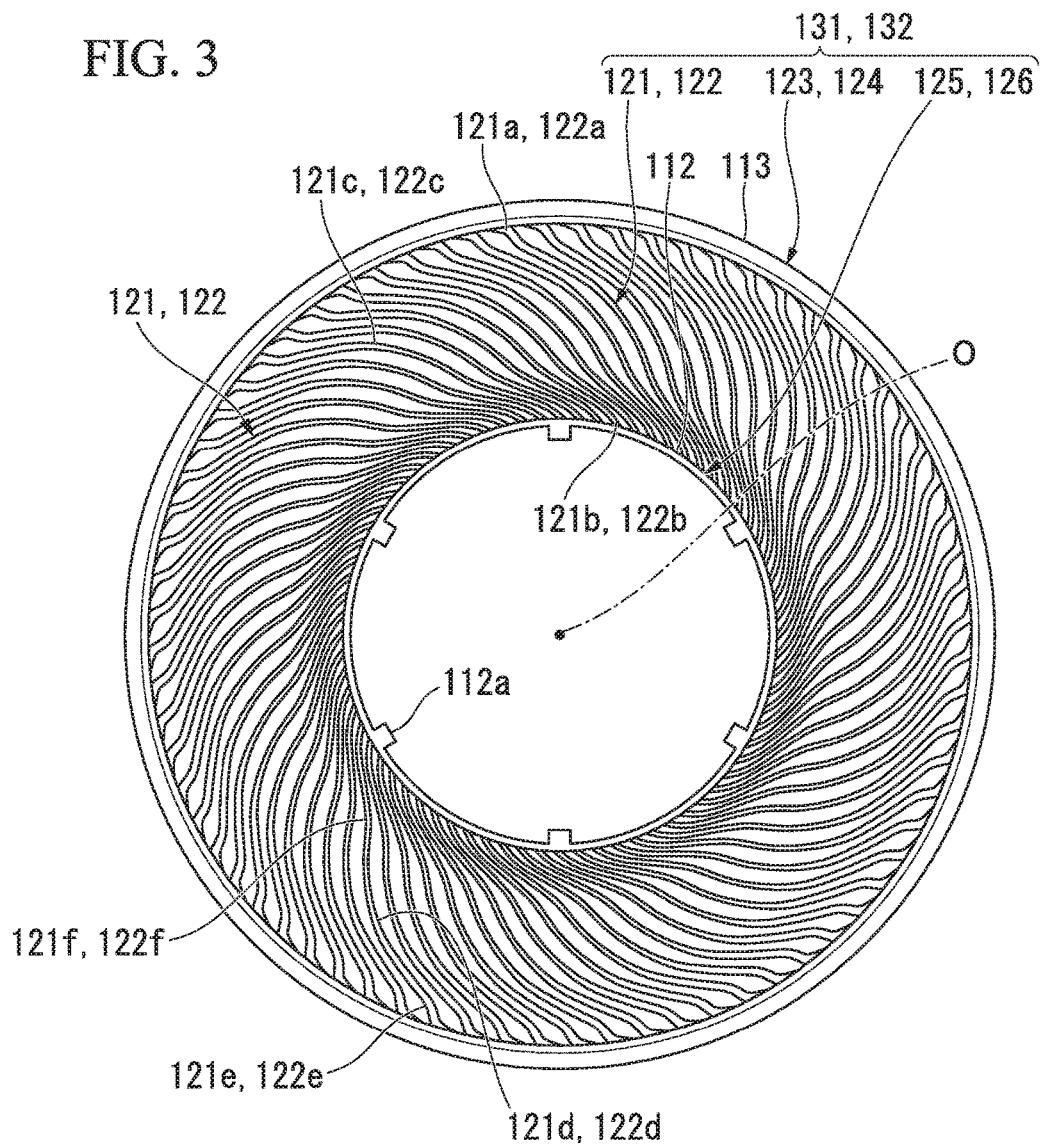
FIG. 3 is a plan view of a first divided case body integrally formed of a first divided ring-shaped body and first connecting plates taken from the first area in the width direction of the tire or is a plan view of a second divided case body integrally formed of a second divided ring-shaped body and second connecting plates taken from a second area next to the tire opposite to the first area in the width direction of the tire.
Figure 4:
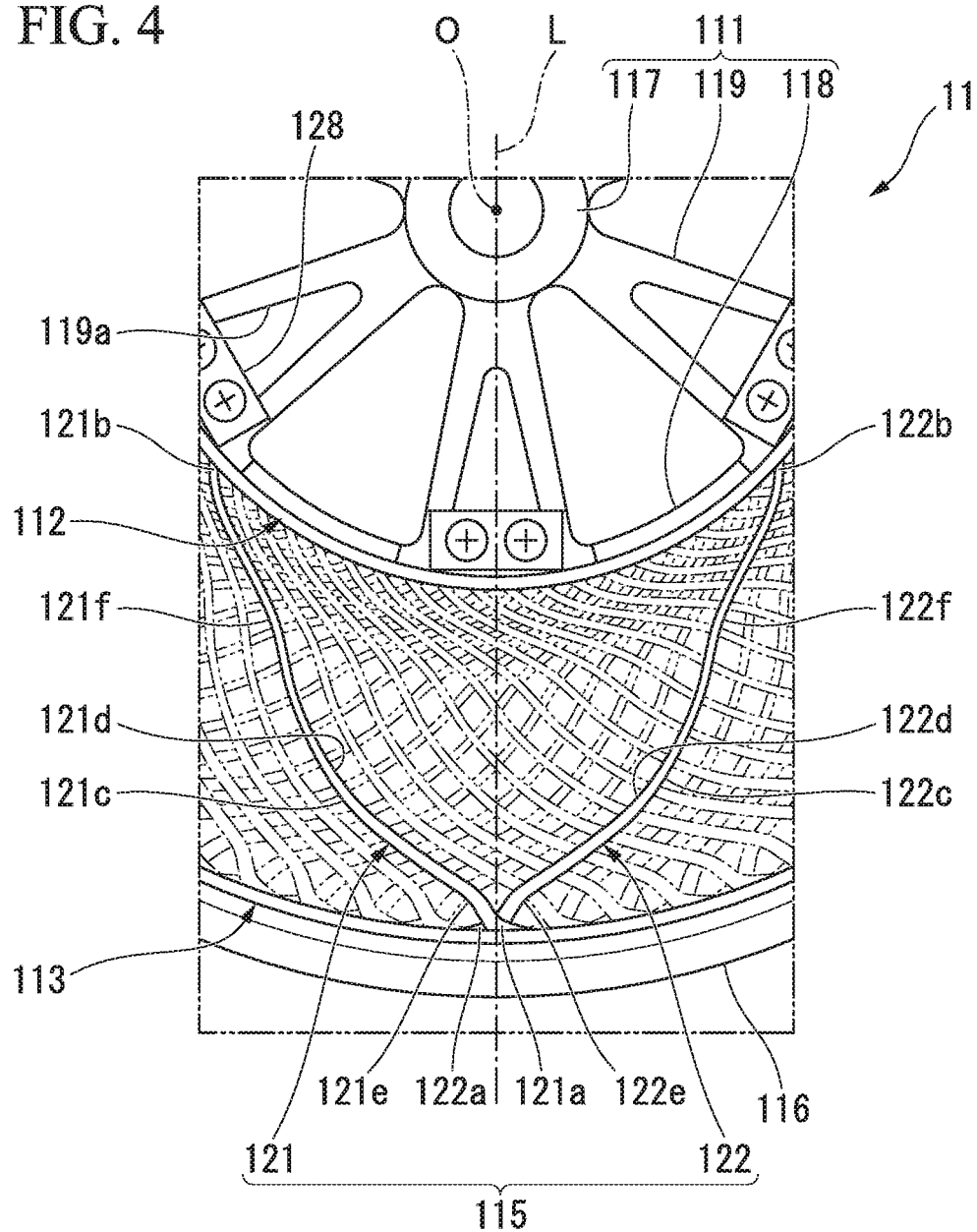
FIG. 4 is an enlarged view showing a main section of FIG. 2.

As shown in FIGS. 2 to 4, a first end part 121a of the first connecting plate 121 connected to the ring-shaped body 113 is positioned to be closer to a first area next to the connecting member 115 in the tire circumferential direction than a second end part 121b of the first connecting plate 121 connected to the outer attachment body 112, and a first end part 122a of the second connecting plate 122 connected to the ring-shaped body 113 is positioned to be closer to a second area next to the connecting member 115 opposite to the first area in the tire circumferential direction than a second end part 122b of the second connecting plate 122 connected to the outer attachment body 112.

The first end parts 121a and 122a of the first and second connecting plates 121 and 122 of the connecting member 115 are connected to positions of the inner circumferential surface of the ring-shaped body 113, and the positions are different from each other in the tire width direction H and are the same in the tire circumferential direction.

In the example shown in the drawings, an intermediate portion 121c of the first connecting plate 121 positioned between the first and second end parts 121a and 121b is provided with curved parts 121d, 121e and 121f curved in the tire circumferential direction, and the curved parts 121d, 121e and 121f are arranged in the extending direction of the first connecting plate 121 in a tire side view of the non-pneumatic tire 11 taken in the tire width direction H. In the first connecting plate 121, curving directions of two curved parts of the curved parts 121d, 121e and 121f next to each other in the extending direction are opposite to each other. An intermediate portion 122c of the second connecting plate 122 positioned between the first and second end parts 122a and 122b is provided with curved parts 122d, 122e and 122f curved in the tire circumferential direction, and the curved parts 122d, 122e and 122f are arranged in the extending direction of the second connecting plate 122 in a tire side view of the non-pneumatic tire 11 taken in the tire width direction H. In the second connecting plate 122, curving directions of two curved parts of the curved parts 122d, 122e and 122f next to each other in the extending direction are opposite to each other.

The curved parts 121d, 121e and 121f provided in the first connecting plate 121 include a first curved part 121d curved to bulge to the second area next to the connecting member 115 in the tire circumferential direction, a second curved part 121e positioned between the first curved part 121d and the first end part 121a and curved to bulge to the first area next to the connecting member 115 in the tire circumferential direction, and a third curved part 121f positioned between the first curved part 121d and the second end part 121b and curved to bulge to the first area next to the connecting member 115 in the tire circumferential direction. The second curved part 121e connects to the first end part 121a.

The curved parts 122*d*, 122*e* and 122*f* provided in the second connecting plate 122 include a first curved part 122*d* curved to bulge to the first area next to the connecting member 115 in the tire circumferential direction, a second curved part 122*e* positioned between the first curved part 122*d* and the first end part 122*a* and curved to bulge to the second area next to the connecting member 115 in the tire circumferential direction, and a third curved part 122*f* positioned between the first curved part 122*d* and the second end part 122*b* and curved to bulge to the second area next to the connecting member 115 in the tire circumferential direction. The second curved part 122*e* connects to the first end part 122*a*.

In the example shown in the drawings, the first curved part 121*d* has a radius of curvature in the tire side view greater than that of the second or third curved part 121*e* or 121*f*, and the first curved part 122*d* has a radius of curvature in the tire side view greater than that of the second or third curved part 122*e* or 122*f*. The second curved part 121*e* connecting to the first end part 121*a* has the minimum radius of curvature of the curved parts 121*d*, 121*e* and 121*f* of the first connecting plate 121, and the second curved part 122*e* connecting to the first end part 122*a* has the minimum radius of curvature of the curved parts 122*d*, 122*e* and 122*f* of the second connecting plate 122. The first curved part 121*d* is disposed in the central part of the first connecting plate 121 in the extending direction, and the first curved part 122*d* is disposed in the central part of the second connecting plate 122 in the extending direction.

The lengths of the first and second connecting plates 121 and 122 are approximately the same, and as shown in FIG. 4, the second end parts 121*b* and 122*b* of the first and second connecting plates 121 and 122 are connected to positions on the outer circumferential surface of the outer attachment body 112 that are disposed on two sides in the tire circumferential direction of a position on the outer circumferential surface of the outer attachment body 112 facing the first end parts 121*a* and 122*a* in the tire radial direction, and the same angle (for example, 20° to 135°) is formed between each of the positions and the position around the axial line O in the tire side view. In the first and second connecting plates 121 and 122, the first curved parts 121*d* and 122*d* project in opposite directions in the tire circumferential direction and have approximately the same size, the second curved parts 121*e* and 122*e* project in opposite directions in the tire circumferential direction and have approximately the same size, and the third curved parts 121*f* and 122*f* project in opposite directions in the tire circumferential direction and have approximately the same size.

Accordingly, as shown in FIG. 4, the shape of each connecting member 115 in the tire side view is in line symmetry with respect to an imaginary line L extending in the tire radial direction and passing through the first end parts 121*a* and 122*a* of the connecting plates 121 and 122.

A first end-side part from a central part in the extending direction of the first connecting plate 121 to the first end part 121*a* has a greater thickness than that of a second end-side part from the central part to the second end part 121*b*, and a first end-side part from a central part in the extending direction of the second connecting plate 122 to the first end part 122*a* has a greater thickness than that of a second end-side part from the central part to the second end part 122*b*. Accordingly, while increase of the weight of the connecting member 115 is limited and the flexibility of the connecting member 115 is secured, the strength of the first end-side part of each of the first and second connecting plates 121 and 122 subject to a large load can be improved. The first and second end-side parts smoothly connect to each other with no step.

In this embodiment, the outer attachment body 112, the ring-shaped body 113 and the connecting members 115 are integrally formed.

In this embodiment, as shown in FIG. 1, the outer attachment body 112 is divided into a first divided outer attachment body 125 and a second divided outer attachment body 126, the first divided outer attachment body 125 is positioned to be close to the first area next to the tire in the tire width direction H, and the second divided outer attachment body 126 is positioned to be close to the second area next to the tire in the tire width direction H. The ring-shaped body 113 is divided into a first divided ring-shaped body 123 (a first cylindrical body) and a second divided ring-shaped body 124 (a second cylindrical body), the first divided ring-shaped body 123 is positioned to be close to the first area next to the tire in the tire width direction H, and the second divided ring-shaped body 124 is positioned to be close to the second area next to the tire in the tire width direction H. In the example shown in the drawings, each of the outer attachment body 112 and the ring-shaped body 113 is divided at the center thereof in the tire width direction H.

The first divided outer attachment body 125 and the first divided ring-shaped body 123 are formed integrally with the first connecting plates 121, and the second divided outer attachment body 126 and the second divided ring-shaped body 124 are formed integrally with the second connecting plates 122.

Furthermore, in this embodiment, the first divided outer attachment body 125, the first divided ring-shaped body 123 and the first connecting plates 121 are integrally formed through casting or injection molding, and the second divided outer attachment body 126, the second divided ring-shaped body 124 and the second connecting plates 122 are integrally formed through casting or injection molding.

Hereinafter, a member in which the first divided outer attachment body 125, the first divided ring-shaped body 123 and the first connecting plates 121 are integrally formed is referred to as a first divided case body 131, and a member in which the second divided outer attachment body 126, the second divided ring-shaped body 124 and the second connecting plates 122 are integrally formed is referred to as a second divided case body 132.

The injection molding may be a general method in which a plurality of parts of the first divided case body 131 are formed at the same time and a plurality of parts of the second divided case body 132 are formed at the same time. In addition, insert molding, what is called two-color molding or the like may be adopted in which in the first divided case body 131, parts of the first divided outer attachment body 125, of the first divided ring-shaped body 123 and of the first connecting plates 121 are formed to be insert parts beforehand, and the other parts thereof are formed through injection molding, and in the second divided case body 132, parts of the second divided outer attachment body 126, of the second divided ring-shaped body 124 and of the second connecting plates 122 are formed to be insert parts beforehand, and the other parts thereof are formed through injection molding.

In the first divided case body 131, the first divided outer attachment body 125, the first divided ring-shaped body 123 and the first connecting plates 121 may be formed of different materials from each other or may be formed of the same material, and in the second divided case body 132, the second divided outer attachment body 126, the second divided ring-shaped body 124 and the second connecting plates 122 may be formed of different materials from each other or may be formed of the same material. These materials include a metal material, a resin material and the like, and in view of weight reduction, it is preferable to employ the resin material, particularly a thermoplastic resin.

In a case where a plurality of parts of each of the divided case bodies 131 and 132 are formed at the same time through injection molding, the ridges 112a provided in the outer attachment body 112 may be used as gates for injection molding.

In the first divided case body 131, the centers of the first connecting plates 121, of the first divided ring-shaped body 123 and of the first divided outer attachment body 125 in the tire width direction H correspond to each other in the tire width direction H, and in the second divided case body 132, the centers of the second connecting plates 122, of the second divided ring-shaped body 124 and of the second divided outer attachment body 126 in the tire width direction H correspond to each other in the tire width direction H. The first divided outer attachment body 125 has a width that is less than that of the first divided ring-shaped body 123 and that is approximately the same as that of the first connecting plate 121, and the second divided outer attachment body 126 has a width that is less than that of the second divided ring-shaped body 124 and that is approximately the same as that of the second connecting plate 122.

Division surfaces 123a and 124a of the first and second divided ring-shaped bodies 123 and 124 facing each other in the tire width direction H are connected through, for example, welding, fusing, adhesion or the like. In a case where the welding is selected from these connection methods, for example, hot-plate welding may be adopted.

Division surfaces of the first and second divided outer attachment bodies 125 and 126 facing each other in the tire width direction H are separated from each other in the tire width direction H. Accordingly, burrs are prevented from occurring on the inner circumferential surface of the outer attachment body 112 that is fitted on the outside of the mount body 111.

In a state before the divided case bodies 131 and 132 are connected as described above, as shown in FIG. 3, the divided case bodies 131 and 132 have the same shape and size.

When the divided case bodies 131 and 132 are connected to each other, while the positions of the divided case bodies 131 and 132 in the tire circumferential direction are adjusted such that each connecting member 115 is in line symmetry in the tire side view as described above, in a state where the attitudes of the divided case bodies 131 and 132 are opposite from each other in the tire width direction H, the division surfaces 123a and 124a of the first and second divided ring-shaped bodies 123 and 124 of the divided case bodies 131 and 132 are brought into contact with each other and are connected together.

The tread member 116 is formed into a cylindrical shape and integrally covers the entire outer circumferential surface of the ring-shaped body 113. In the example shown in the drawings, the entire inner circumferential surface of the tread member 116 closely contacts the outer circumferential surface of the ring-shaped body 113. The tread member 116 is formed of, for example, vulcanized rubber in which at least one of natural rubber and rubber composition is vulcanized, a thermoplastic material or the like. The thermoplastic material includes, for example, a thermoplastic elastomer, a thermoplastic resin and the like. The thermoplastic elastomer includes, for example, an amide-based thermoplastic elastomer (TPA), an ester-based thermoplastic elastomer (TPC), an olefin-based thermoplastic elastomer (TPO), a styrene-based thermoplastic elastomer (TPS), a urethane-based thermoplastic elastomer (TPU), crosslinked thermoplastic rubber (TPV), another thermoplastic elastomer (TPZ) and the like, which are provided in JIS K 6418. The thermoplastic resin includes, for example, a urethane resin, an olefin resin, a vinyl chloride resin, a polyamide resin and the like. In view of abrasion resistance, it is preferable to form the tread member 116 of vulcanized rubber.

Figure 5:
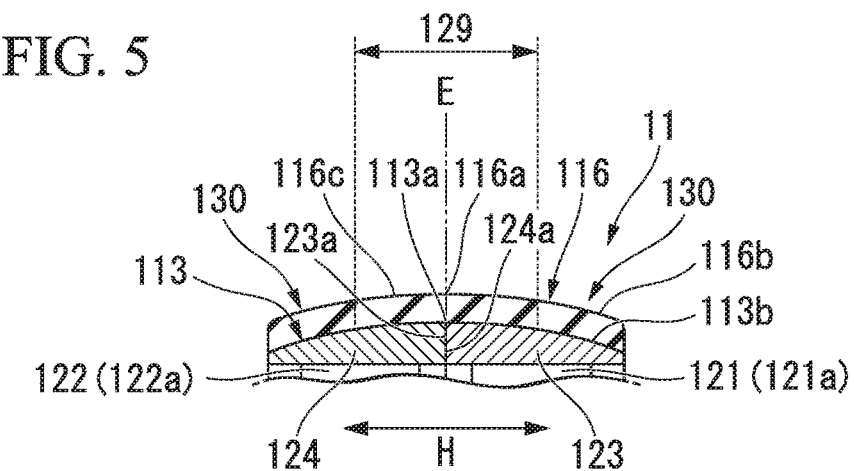
FIG. 5 is a cross-sectional view of a tread member and a ring-shaped body of the non-pneumatic tire shown in FIGS. 1 to 4 taken in the width direction of the tire.

As shown in FIG. 5, an outer circumferential surface 116b of the tread member 116 is formed into a curved surface whose cross-section taken in the tire width direction H bulges outward in the tire radial direction, and the outer diameter of the tread member 116 gradually decreases from a maximum outer diameter part 116a of the tread member 116 to each of two ends of the tread member 116 in the tire width direction H between which the maximum outer diameter part 116a is disposed. The outer diameter of the tread member 116 is the distance in the tire radial direction between the outer circumferential surface 116b of the tread member 116 and the axial line O. The maximum outer diameter part 116a of the tread member 116 is positioned in the central part of the non-pneumatic tire 11 in the tire width direction H. The thickness in the tire radial direction of the tread member 116 is approximately the same on the entire area thereof.

As shown in FIG. 5, the center of the tread member 116 in the tire width direction H is referred to as a tire equator E, and a partial area of the tread member 116 including at least the tire equator E is referred to as a central area 129. The central area 129 is an area obtained by removing from the tread member 116, shoulder parts 130 positioned in two end parts of the tread member 116 in the tire width direction H. The shoulder parts 130 reach edges of the tread member 116. The width in the tire width direction H of the central area 129 of this embodiment is 50% of the width of the tread member 116. The central position of the central area 129 in the tire width direction H corresponds to the central position (the tire equator E) of the tread member 116 therein. The outline of the cross-section of the outer surface 116c of the central area 129 taken in the tire width direction H is a curved line that bulges outward in the tire radial direction.

As described above, since the outer circumferential surface 116b of the tread member 116 is formed into a curved surface whose cross-section taken in the tire width direction H projects outward in the tire radial direction, the outer surface 116c of the central area 129 is positioned outside in the tire radial direction of the outer surfaces of the shoulder parts 130. Thus, when the tire 11 mounted on a vehicle contacts the ground, while the tread member 116 resiliently deforms, the outer surface 116c of the central area 129 mainly contacts road surface. In addition, in this embodiment, although the outline of the cross-section of the outer surface of the shoulder part 130 taken in the tire width direction is also formed into a curved line that bulges outward in the tire radial direction, the outline may linearly extend and may incline such that the separation between the outer surface and a straight line extending in the tire width direction and positioned outside of the outer surface in the tire radial direction gradually increases toward each of two ends of the tread member 116 in the tire width direction.

The outer diameter of the ring-shaped body 113 becomes the maximum at the same position in the tire width direction H as the maximum outer diameter part 116a of the tread member 116 and gradually decreases from the position to each of two ends of the ring-shaped body 113 in the tire width direction H between which the position is disposed. The outer diameter of the ring-shaped body 113 is the distance in the tire radial direction between an outer circumferential surface 113b of the ring-shaped body 113 and the axial line O. In the example shown in the drawings, the outer circumferential surface 113b of the ring-shaped body 113 is formed into a curved surface whose cross-section taken in the tire width direction H bulges outward in the tire radial direction, and the inner circumferential surface of the ring-shaped body 113 is formed into a cylindrical surface that extends parallel with the tire width direction H. The curvature of the outline of the cross-section of the outer circumferential surface 113b of the ring-shaped body 113 of this embodiment taken in the tire width direction is approximately the same as the curvature of the outline of the cross-section of the outer circumferential surface 116b of the tread member 116 taken in the tire width direction.

A maximum outer diameter part 113a of the ring-shaped body 113 is positioned in the central part of the non-pneumatic tire 11 in the tire width direction H.

As described above, since the ring-shaped body 113 is divided at the center thereof in the tire width direction H, the ring-shaped body 113 has a thickness in the tire radial direction that gradually increases toward the division surfaces 123a and 124a (namely, toward the divided part of the ring-shaped body 113) in the tire width direction H. That is, the thickness in the tire radial direction of the ring-shaped body 113 gradually increases toward the maximum outer diameter part 113a of the ring-shaped body 113 in the tire width direction.

In this embodiment, the first end parts 121a and 122a of the first and second connecting plates 121 and 122 are connected to positions of the ring-shaped body 113 different from the maximum outer diameter part 113a in the tire width direction H. In the example shown in the drawings, the first end parts 121a and 122a of the first and second connecting plates 121 and 122 are connected to two positions on the inner circumferential surface of the ring-shaped body 113 between which the maximum outer diameter part 113a is disposed in the tire width direction H.

As described above, according to the non-pneumatic tire 11 of this embodiment, the outer diameter of the ring-shaped body H3 becomes the maximum at the same position as the maximum outer diameter part 116a of the tread member 116 in the tire width direction H and gradually decreases from the position to each of two ends of the ring-shaped body 113 in the tire width direction H between which the position is disposed. Therefore, the tread member 116 attached to the outside of the ring-shaped body 113 and having the above-described outer circumferential surface can be obtained without significantly increasing the thickness in the tire radial direction of the maximum outer diameter part 116a. That is, since the outer circumferential surface of the ring-shaped body 113 has a shape similar to that of the outer circumferential surface of the tread member 116, the distance between these outer circumferential surfaces, namely the thickness of the tread member 116, can be limited from varying according to positions in the tire width direction H. Thus, it is possible to prevent the rigidity of the maximum outer diameter part 116a of the tread member 116 from significantly decreasing compared to another part thereof and to obtain good vehicle maneuverability.

The connecting member 115 is connected to positions of the ring-shaped body 113 different in the tire width direction H from the maximum outer diameter part 113a having the maximum thickness in the tire radial direction of the ring-shaped body 113. Therefore, it is possible to limit the rigidity of the ring-shaped body 113 from varying according to positions in the tire width direction H and to reliably obtain good vehicle maneuverability.

Since the ring-shaped body 113 is divided into two parts in the tire width direction H, it is possible to easily form the ring-shaped body 113 even if the ring-shaped body 113 has a complex structure.

The thickness in the tire radial direction of each of the first and second divided ring-shaped bodies 123 and 124 configuring the ring-shaped body 113 gradually increases toward the division surfaces 123a and 124a in the tire width direction H. Therefore, it is possible to increase the areas of the division surfaces 123a and 124a and to firmly connect the division surfaces 123a and 124a of the divided ring-shaped bodies 123 and 124.

Next, a verification test relating to the above operations and effects is described.

For this test, six types of non-pneumatic tires were prepared in which only the structures of the ring-shaped bodies 113 of these tires are different and the other structures are approximately the same.

For a practical example 1, the non-pneumatic tire 11 of the first embodiment shown in FIGS. 1 to 5 was employed.

Figure 6:
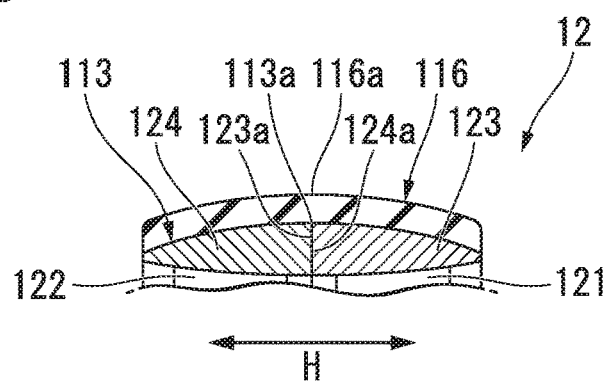
FIG. 6 is a cross-sectional view of a tread member and a ring-shaped body of a second embodiment of the present invention taken in the width direction of the tire.

For a practical example 2, a non-pneumatic tire 12 of a second embodiment of the present invention as shown in FIG. 6 was employed. In the non-pneumatic tire 12, the outer circumferential surface of the ring-shaped body 113 is formed into a curved surface whose cross-section taken in the tire width direction H bulges outward in the tire radial direction, the inner circumferential surface of the ring-shaped body 113 is formed into a curved surface whose cross-section taken in the tire width direction H bulges inward in the tire radial direction, and the thickness of the ring-shaped body 113 gradually increases toward the maximum outer diameter part 113a in the tire width direction H.

Figure 7:
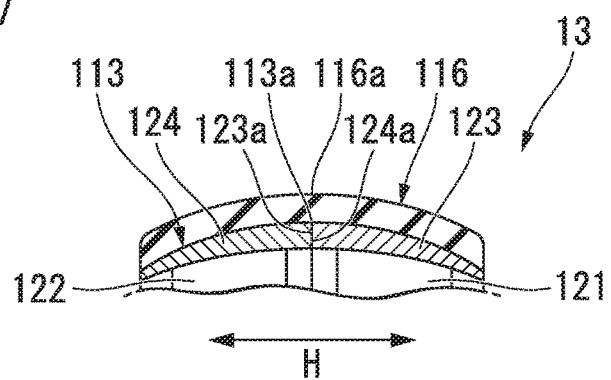
FIG. 7 is a cross-sectional view of a tread member and a ring-shaped body of a third embodiment of the present invention taken in the width direction of the tire.

For a practical example 3, a non-pneumatic tire 13 of a third embodiment of the present invention as shown in FIG. 7 was employed. In the non-pneumatic tire 13, each of the outer and inner circumferential surfaces of the ring-shaped body 113 is a curved surface whose cross-section taken in the tire width direction H bulges outward in the tire radial direction, and the thickness of the ring-shaped body 113 gradually increases toward the maximum outer diameter part 113a in the tire width direction H. The curvature of the cross-section of the outer circumferential surface of the ring-shaped body 113 is set greater than that of the inner circumferential surface thereof.

Figure 8:
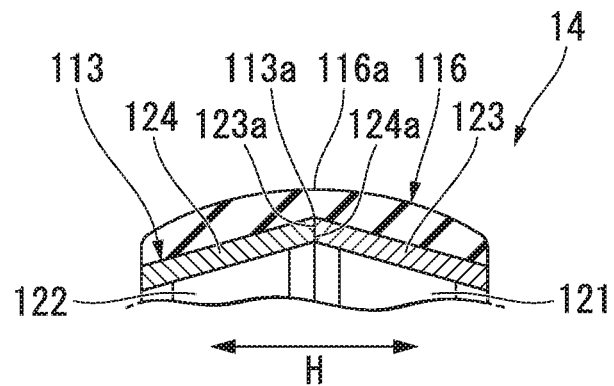
FIG. 8 is a cross-sectional view of a tread member and a ring-shaped body of a fourth embodiment of the present invention taken in the width direction of the tire.

For a practical example 4, a non-pneumatic tire 14 of a fourth embodiment of the present invention as shown in FIG. 8 was employed. In the non-pneumatic tire 14, the cross-section of each surface of the outer and inner circumferential surfaces of the ring-shaped body 113 taken in the tire width direction H linearly extends such that the separation between the surface and a straight line extending in the tire width direction and positioned outside of the surface in the tire radial direction gradually increases from the maximum outer diameter part 113a to each of two ends of the ring-shaped body 113 in the tire width direction H between which the maximum outer diameter part 113a is disposed, and the thickness of the ring-shaped body 113 is approximately the same on the entire area thereof.

Figure 9:
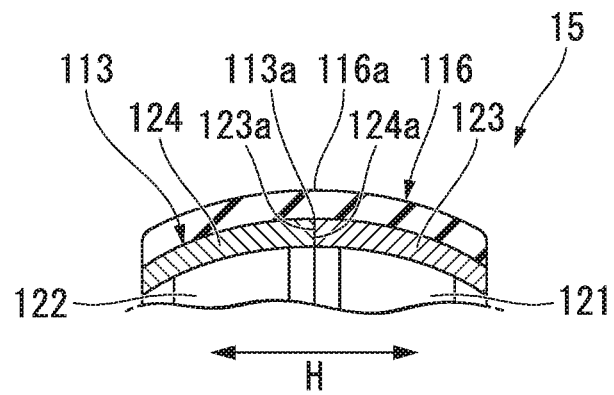
FIG. 9 is a cross-sectional view of a tread member and a ring-shaped body of a fifth embodiment of the present invention taken in the width direction of the tire.

For a practical example 5, a non-pneumatic tire 15 as shown in FIG. 9 was employed in which each of the outer and inner circumferential surfaces of the ring-shaped body 113 is formed into a curved surface whose cross-section taken in the tire width direction H bulges outward in the tire radial direction, and the thickness of the ring-shaped body 113 is approximately the same on the entire area thereof.

Figure 10:
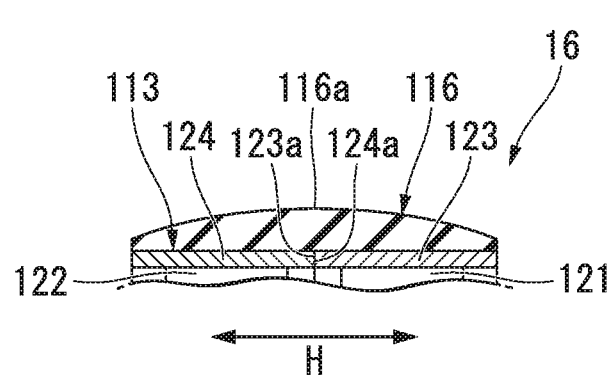
FIG. 10 is a cross-sectional view of a tread member and a ring-shaped body of a comparative example taken in the width direction of the tire.

For a comparative example, a non-pneumatic tire 16 as shown in FIG. 10 was employed. In the non-pneumatic tire 16, each of the outer and inner circumferential surfaces of the ring-shaped body 113 is formed into a cylindrical surface whose cross-section taken in the tire width direction H extends parallel with the tire width direction H, and the thickness of the ring-shaped body 113 is approximately the same on the entire area thereof. In the non-pneumatic tire 16, the thickness of the tread member 116 in the tire radial direction gradually increases toward the maximum outer diameter part 116a in the tire width direction H.

The weight of tire, the maneuverability and the connection strength of each of the non-pneumatic tires 11 to 16 were evaluated.

The maneuverability was evaluated based on feeling of a driver that drove a vehicle mounted with the tire.

The connection strength was evaluated based on a force that was added to each of the non-pneumatic tires 11 to 16 in a direction in which the first and second divided ring-shaped bodies 123 and 124 were separated from each other and that caused a crack between the divided ring-shaped bodies 123 and 124.

The results are shown in the following table 1. Each evaluation is shown by an index when the obtained result with respect to the non-pneumatic tire 16 of the comparative example is 100. The maneuverability and the connection strength show that the greater the numerical values are, the better.

TABLE 1

| | WEIGHT | MANEUVERABILITY | CONNECTION STRENGTH |
|---|---|---|---|
| PRACTICAL EXAMPLE 1 | 95 | 106 | 130 |
| PRACTICAL EXAMPLE 2 | 103 | 106 | 150 |
| PRACTICAL EXAMPLE 3 | 89 | 105 | 110 |
| PRACTICAL EXAMPLE 4 | 98 | 102 | 105 |
| PRACTICAL EXAMPLE 5 | 94 | 108 | 110 |
| COMPARATIVE EXAMPLE | 100 | 100 | 100 |

As a result, it was confirmed that the maneuverability and the connection strength of each of the non-pneumatic tires 11 to 15 of the practical examples 1 to 5 are improved compared to those of the non-pneumatic tire 16 of the comparative example.

It was confirmed that the connection strength of each of the non-pneumatic tires 11 and 12 of the practical examples 1 and 2, in which the thickness of the ring-shaped body 113 is increased at the maximum outer diameter part 113a, of the non-pneumatic tires 11 to 15 of the practical examples 1 to 5 is significantly improved compared to those of the other non-pneumatic tires.

The technical scope of the present invention is not limited to the above embodiments, and various modifications can be adopted within the scope of the present invention.

For example, the curving directions of the curved parts 121d, 121e and 121f of the first connecting plate 121 and of the curved parts 122d, 122e and 122f of the second connecting plate 122 are not limited to the above embodiments and may be appropriately changed.

The above embodiments show a configuration in which the connecting member 115 includes the first and second connecting plates 121 and 122. Instead of this, a configuration may be adopted in which the connecting member 115 includes another connecting plate provided whose position is different from the first and second connecting plates 121 and 122 in the tire width direction H in addition to the first and second connecting plates 121 and 122.

Connecting members 115 may be arranged in the tire width direction H between the outer attachment body 112 and the ring-shaped body 113.

Instead of the above embodiments, for example, the second end parts 121b and 122b of the first and second connecting plates 121 and 122 may be connected to positions of the outer circumferential surface of the outer attachment body 112 between which the axial line O is disposed in the tire radial direction or may be connected to positions of the outer circumferential surface of the outer attachment body 112 that face the first end parts 121a and 122a of the first and second connecting plates 121 and 122 in the tire radial direction.

Instead of the above embodiments, the first end parts 121a and 122a of the connecting plates 121 and 122 may be connected to different positions in the tire circumferential direction of the inner circumferential surface of the ring-shaped body 113.

Although in the above embodiments, a gap is provided between the first and second divided outer attachment bodies 125 and 126 in the tire width direction H, it may be unnecessary to provide a gap therebetween. The first and second divided outer attachment bodies 125 and 126 may directly contact each other.

Each of the outer attachment body 112 and the ring-shaped body 113 may be divided into three parts or more, or it may be unnecessary to divide each thereof.

The first and second divided case bodies 131 and 132 may be formed through, for example, cutting machining or the like other than that of the above embodiments.

In the above embodiments, the outer attachment body 112, the ring-shaped body 113 and the connecting members 115 are integrally formed. However, the present invention is not limited thereto, and they may be connected together after they are individually formed. The outer attachment body 112 may be formed integrally with the mount body 111.

In the above embodiments, a configuration is described in which the second end parts 121b and 122b of the connecting member 115 are indirectly connected to the mount body 111 through the outer attachment body 112. However, the present invention is not limited thereto, the second end parts 121b and 122b of the connecting member 115 may be directly connected to the mount body 111.

In the above embodiments, the maximum outer diameter part 113a of the ring-shaped body 113 and the maximum outer diameter part 116a of the tread member 116 are arranged in the central part in the tire width direction H of each of the non-pneumatic tires 11 to 15. However, the maximum outer diameter part 113a or 116a may be arranged in a position different from the central part in the tire width direction H.

Both of the first end parts 121a and 122a of the first and second connecting plates 121 and 122 may be connected to a position closer to the first area or the second area next to the tire in the tire width direction H than the maximum outer diameter part 113a.

Figure 11:
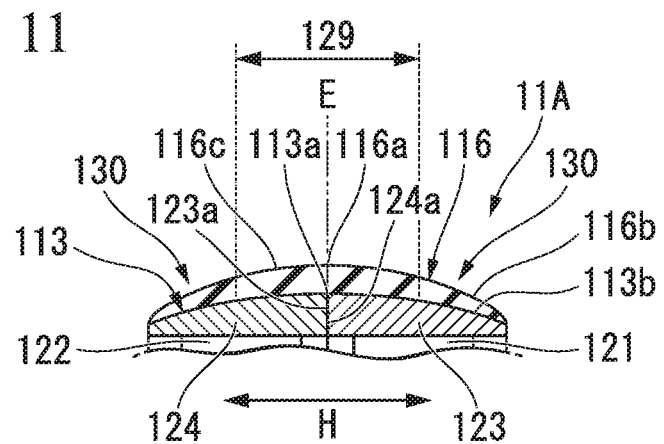
FIG. 11 is a cross-sectional view of a tread member and a ring-shaped body of a modification of the first embodiment of the present invention taken in the width direction of the tire.

A modification of the first embodiment as shown in FIG. 11 may be adopted. A non-pneumatic tire 11A of this modification includes the same structures as those of the non-pneumatic tire 11 of the first embodiment other than that of a tread member 116 (a tread portion).

The outer circumferential surface 116b of the tread member 116 is a curved surface whose cross-section taken in the tire width direction H bulges outward in the tire radial direction, and the outer diameter of the tread member 116 gradually decreases from the maximum outer diameter part 116a to each of two ends of the tread member 116 in the tire width direction between which the maximum outer diameter part 116a is disposed. The central area 129 of the tire 11A has the same structure as that of the first embodiment.

The curvature of the outline of the cross-section taken in the tire width direction of the outer circumferential surface 116b of the tread member 116 is set greater than that of the outline of the cross-section taken in the tire width direction of the outer circumferential surface 113b of the ring-shaped body 113. Thus, unlike the first embodiment, the thickness of the tread member 116 in the tire radial direction gradually increases toward the maximum outer diameter part 116a in the tire width direction. In other words, the thickness in the tire radial direction of the tread member 116 within the central area 129 is set greater than the thickness of each of the shoulder parts 130 positioned outside of the central area 129 in the tire width direction.

According to this modification, the projecting shape of the outer circumferential surface 116b of the tread member 116 projecting outward in the tire radial direction, particularly the projecting shape of the outer circumferential surface 116b of the central area 129, is obtained by thickening the central part of the ring-shaped body 113 in the width direction and by thickening the central part of the tread member 116 in the width direction. Therefore, it is possible to decrease the thickness of the central part in the width direction of the ring-shaped body 113 compared to that of the first embodiment and to obtain both of reduction of the weight of tire and good vehicle maneuverability.

A component of the above embodiments may be appropriately replaced with another known component within the scope of the present invention, and the above embodiments may be appropriately combined with the above modification.

Hereinafter, a non-pneumatic tire of a sixth embodiment of the present invention is described with reference to the drawings. The structure of each part of the non-pneumatic tire is not limited to the following description.

Figure 12:
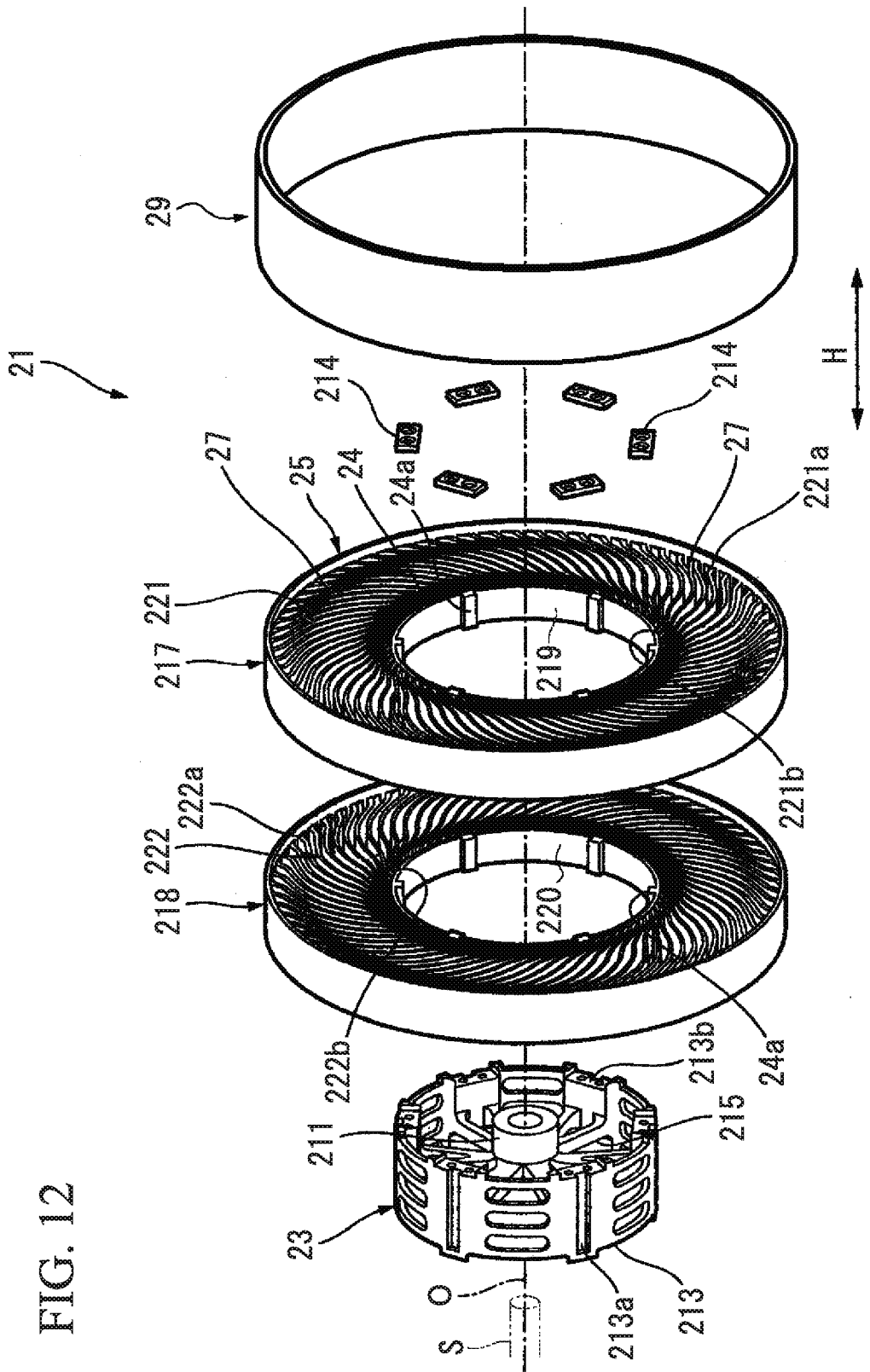
FIG. 12 is a schematic perspective view of a non-pneumatic tire of a sixth embodiment of the present invention in which parts of the tire are exploded.

As shown in FIG. 12, a non-pneumatic tire (hereinafter, simply referred to as the "tire") 21 includes a mount body 23 that is mounted on an axle S (a shaft), an outer cylindrical body 25 encircling the mount body 23 from outside of the mount body 23 in the radial direction of the tire, connecting members 27 arranged in the circumferential direction of the tire between the mount body 23 and the outer cylindrical body 25 and connecting the mount body 23 and the outer cylindrical body 25 such that the mount body 23 and the outer cylindrical body 25 are resiliently movable relative to each other, and a tread portion 29 encircling the outer cylindrical body 25 from outside of the outer cylindrical body 25 in the radial direction of the tire. In addition, in this example, an inner cylindrical body 24 attached to the outside of the mount body 23 is provided, and the connecting members 27 are arranged between the inner and outer cylindrical bodies 24 and 25. The mount body 23 is formed of, for example, a metal material such as aluminum alloy. The tread portion 29 is formed of, for example, vulcanized rubber in which at least one of natural rubber and rubber composition is vulcanized, a thermoplastic material or the like. The thermoplastic material includes, for example, a thermoplastic elastomer, a thermoplastic resin and the like. The thermoplastic elastomer includes, for example, an amide-based thermoplastic elastomer (TPA), an ester-based thermoplastic elastomer (TPC), an olefin-based thermoplastic elastomer (TPO), a styrene-based thermoplastic elastomer (TPS), a urethane-based thermoplastic elastomer (TPU), crosslinked thermoplastic rubber (TPV), another thermoplastic elastomer (TPZ) and the like, which are provided in JIS K 6418. The thermoplastic resin includes, for example, a urethane resin, an olefin resin, a vinyl chloride resin, a polyamide resin and the like. In view of abrasion resistance, it is preferable to form the tread portion 29 of vulcanized rubber.

The mount body 23, the inner cylindrical body 24, the outer cylindrical body 25 and the tread portion 29 are arranged coaxially with a common axis. Hereinafter, the common axis is referred to as an axial line O, a direction parallel to the axial line O is referred to as a tire width direction H, a direction orthogonal to the axial line O is referred to as a tire radial direction, and a direction around the axial line O is referred to as a tire circumferential direction. In this example, the mount body 23, the inner cylindrical body 24, the outer cylindrical body 25 and the tread portion 29 are arranged such that the positions of the centers thereof in the tire width direction H are the same in the tire width direction H. In this embodiment, the outer cylindrical body 25 is divided at the center thereof in the tire width direction H into a first outer cylindrical body 217 (a first cylindrical body) and a second outer cylindrical body 218 (a second cylindrical body), the first outer cylindrical body 217 is positioned to be close to a first area next to the tire in the tire width direction H, the second outer cylindrical body 218 is positioned to be close to a second area next to the tire opposite to the first area in the tire width direction H, and the edges of the first and second outer cylindrical bodies 217 and 218 are joined together through, for example, welding, adhesion or the like. In a case where the welding is selected from these joining methods, for example, hot-plate welding may be adopted. The inner cylindrical body 24 is divided into a first inner cylindrical body 219 and a second inner cylindrical body 220, the first inner cylindrical body 219 is positioned to be close to the first area next to the tire in the tire width direction H, and the second inner cylindrical body 220 is positioned to be close to the second area next to the tire in the tire width direction H. The connecting member 27 includes a first resilient connecting plate 221 (a first connecting member) and a second resilient connecting plate 222 (a second connecting member), the first resilient connecting plate 221 is a connecting member being close to the first area next to the tire, the second resilient connecting plate 222 is a connecting member being close to the second area next to the tire, and the first and second resilient connecting plates 221 and 222 are disposed to be separated from each other in the tire width direction H. First resilient connecting plates 221 next to each other in the tire circumferential direction do not contact each other, and second resilient connecting plates 222 next to each other in the tire circumferential direction do also not contact each other. First and second resilient connecting plates 221 and 222 next to each other in the tire width direction H do also not contact each other. The first and second resilient connecting plates 221 and 222 have approximately the same width and shape. A first end part 221a of the first resilient connecting plate 221 connected to the outer cylindrical body 25 is positioned to be closer to a first area next to the connecting member 27 in the tire circumferential direction than a second end part 221b of the first resilient connecting plate 221 connected to the inner cylindrical body 24, and a first end part 222a of the second resilient connecting plate 222 connected to the outer cylindrical body 25 is positioned to be closer to a second area next to the connecting member 27 opposite to the first area in the tire circumferential direction than a second end part 222b of the second resilient connecting plate 222 connected to the inner cylindrical body 24. In the example shown in the drawings, an intermediate portion of the first resilient connecting plate 221 positioned between the first and second end parts 221a and 221b is provided with curved parts arranged in the extending direction of the connecting plate 221, and an intermediate portion of the second resilient connecting plate 222 positioned between the first and second end parts 222a and 222b is provided with curved parts arranged in the extending direction of the connecting plate 222. In this example, the first inner cylindrical body 219, the first outer cylindrical body 217 and the first resilient connecting plates 221 are integrally formed, and similarly, the second inner cylindrical body 220, the second outer cylindrical body 218 and the second resilient connecting plates 222 are integrally formed.

The inner circumferential surface of the inner cylindrical body 24 is provided with ridges 24a at intervals in the tire circumferential direction, and the ridges 24a project inward of the inner cylindrical body 24 in the tire radial direction and extend on the entire length of the inner cylindrical body 24 in the tire width direction H. The mount body 23 includes a mount cylindrical portion 211 that is mounted on the end of the axle S, an outer ring portion 213 encircling the mount cylindrical portion 211 from outside of the mount cylindrical portion 211 in the tire radial direction, and ribs 215 connecting the mount cylindrical portion 211 and the outer ring portion 213 to each other. The outer circumferential surface of the outer ring portion 213 is provided with key grooves 213a at intervals in the tire circumferential direction, and the key grooves 213a are depressed inward of the outer ring portion 213 in the tire radial direction and extend in the tire width direction H. Only one of two ends in the tire width direction H of the key groove 213a that is close to the first area next to the tire opens, and the other of the two ends thereof that is close to the second area next to the tire closes. The ridges 24a of the inner cylindrical body 24 fit into the key grooves 213a. An edge of the outer ring portion 213 close to the first area next to the tire in the tire width direction H is provided with recesses 213b, and the recesses 213b are disposed at positions corresponding to the key grooves 213a in the tire circumferential direction and are fitted with plates 214. The plate 214 is provided with through-holes. A bottom wall surface of the wall surfaces forming the recess 213b facing the first area next to the tire in the tire width direction H is provided with female-threaded portions that communicate with the through-holes of the plate 214 fitted into the recess 213b. The female-threaded portions are formed at intervals in the tire circumferential direction, and the through-holes are also formed at intervals in the tire circumferential direction. In a state where the inner cylindrical body 24 is fitted on the outside of the mount body 23 and the ridges 24a are fitted into the key grooves 213a, bolts are screwed into the female-threaded portions through the through-holes of the plates 214 fitted into the recesses 213b, whereby the inner cylindrical body 24 is fixed to the mount body 23.

Figure 13:
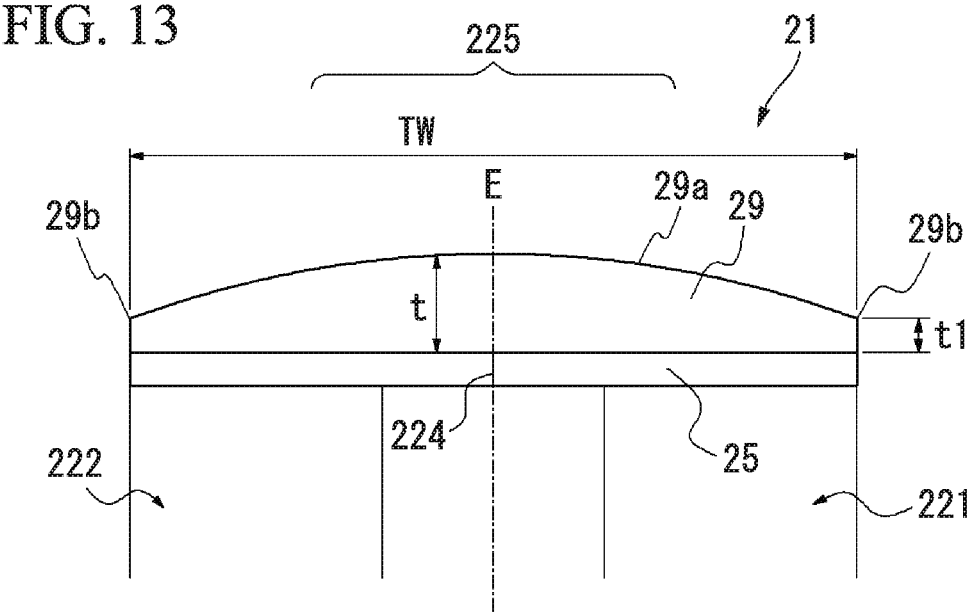
FIG. 13 is a cross-sectional view showing part of the non-pneumatic tire of the sixth embodiment of the present invention taken in the width direction of the tire.

The tread portion 29 is formed into a cylindrical shape and is integrally adhered to the outer circumferential surface of the outer cylindrical body 25 so as to cover the entire outer circumferential surface thereof. FIG. 13 shows a cross-section taken in the tire width direction of the tread portion 29 and the outer cylindrical body 25 of the non-pneumatic tire 21. As shown in FIG. 13, in the non-pneumatic tire 21, the outline 29a of the outer surface of a central area 225 of the tread portion 29 is formed into a curved line bulging outward in the tire radial direction, the central area 225 is a tire width-direction area having a width that is 50% of the tread width TW of the tread portion 29, and the center of the central area 225 in the tire width direction is at the same position as a tire equational plane E (the tire equator) of the tire. In this example, the outline 29a is formed into an arc bulging outward in the tire radial direction between two ends 29b of the tread portion 29 in the tire width direction, and the center of the arc is positioned to be inward in the tire radial direction compared to the outline 29a. The thickness t in the tire radial direction of the tread portion 29 at every position within the entire central area 225 in the tire width direction other than part of the tread portion 29 whose outer surface is provided with grooves (not shown) is greater than the thickness t1 in the tire radial direction of the ends 29b of the tread portion 29 in the tire width direction.

Figure 18:
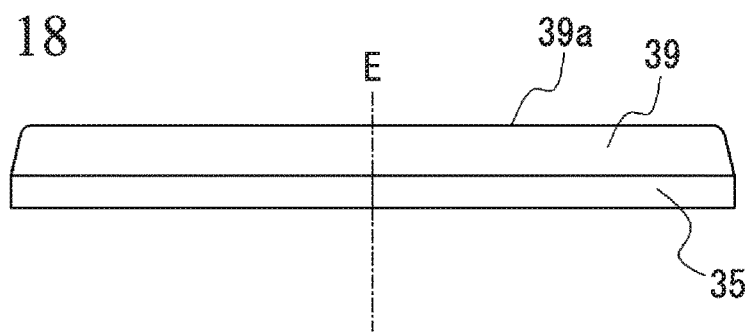
FIG. 18 is a cross-sectional view showing part of a conventional non-pneumatic tire taken in the width direction of the tire.

Since in the non-pneumatic tire 21 having the above configuration, part of the outer surface of the tread portion 29 appropriately contacts road surface according to a camber angle, the non-pneumatic tire 21 can obtain higher ground contact performance than that of a conventional tire as shown in FIG. 18 in which the outline 39a of the outer surface of a tread portion 39 thereof linearly extends. Thus, the present invention is particularly effective in a two-wheeled vehicle that has a large camber angle during cornering. The outline 29a of the cross-section of the outer surface of the tread portion 29 taken in the tire width direction may be a shape in which curved and straight lines are connected together. In view of improvement of the ground contact performance with respect to road surface, in each of the above cases, it is preferable that the outline 29a smoothly extend without corners. It is preferable that the outline 29a of the outer surface of the tread portion 29 of a tire expected to be used with a large camber angle be an arc having a small radius of curvature or a combination of arc and straight lines having small radiuses of curvature, whereby high ground contact performance can be obtained even if the camber angle is large.

In general use of the non-pneumatic tire 21, the time in which a vehicle runs in a state of having a small camber angle or of substantially having no camber angle is longer than the time in which the vehicle runs in a state of having a large camber angle. In this case, since the central area 225 of the tread portion 29 mainly contacts road surface, the central area 225 may be liable to wear compared to the ends of the tread portion 29. Since the thickness t in the tire radial direction of the central area 225 of the tread portion 29 is greater than the thickness t1 of the ends 29b thereof in the tire width direction, the tire 21 has a long wear life.

Figure 14:
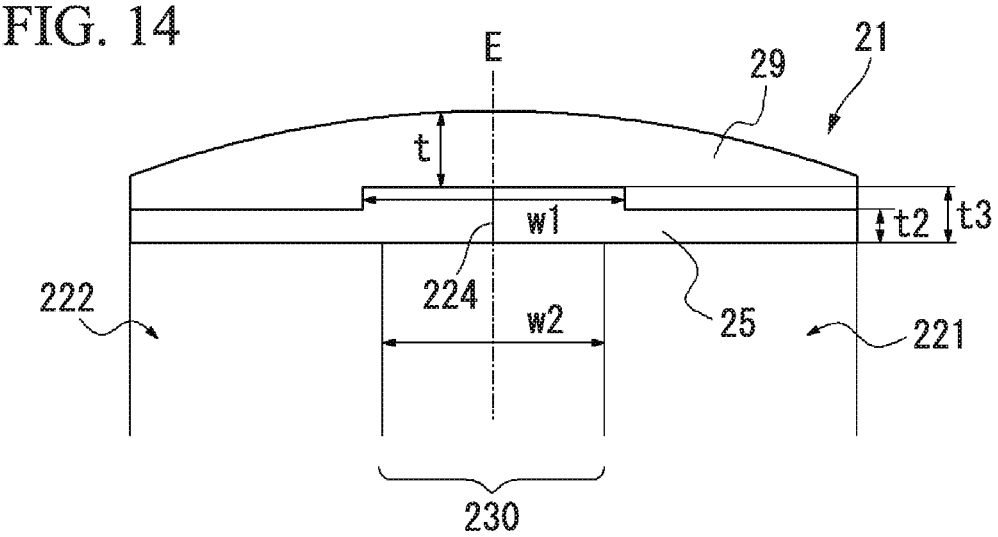
FIG. 14 is a cross-sectional view showing part of a non-pneumatic tire of a seventh embodiment of the present invention taken in the width direction of the tire.

As shown in FIG. 14, in a seventh embodiment of the present invention, the thickness t3 in the tire radial direction of a joined part 224 between the first and second outer cylindrical bodies 217 and 218 of the outer cylindrical body 25 is greater than the average thickness of the outer cylindrical body 25 in the tire radial direction, whereby the contact area through which the first and second outer cylindrical bodies 217 and 218 are joined together is increased, and thus the joint strength through welding, adhesion or the like can be improved.

As shown in FIG. 14, it is preferable that the thickness in the tire radial direction of the outer cylindrical body 25 between the first resilient connecting plate 221 that is a connecting member being close to the first area next to the tire and the second resilient connecting plate 222 that is a connecting member being close to the second area next to the tire, namely the thickness in the tire radial direction of the outer cylindrical body 25 within a tire width-direction area 230 in which the connecting members 27 are not arranged, be greater than the average thickness of the outer cylindrical body in the tire radial direction at every position within the area. Although the rigidity of the tire width-direction area 230 of the outer cylindrical body 25 in which the connecting members 27 are not arranged may be liable to become low because the tire width-direction area 230 is not supported in the tire radial direction, a sufficient rigidity thereof can be secured by increasing the thickness of this part of the outer cylindrical body 25 compared to the other parts thereof, and thus the steering stability during running can be improved. In addition, as shown in FIG. 14, it is preferable that the width w1 in the tire width direction of a portion of the outer cylindrical body 25, the portion being formed having a large thickness in the tire radial direction, be greater than the width w2 of the tire width-direction area 230 in which the connecting members 27 are not arranged, whereby the rigidity thereof can be reliably increased, and the steering stability can be reliably improved.

Figure 15:
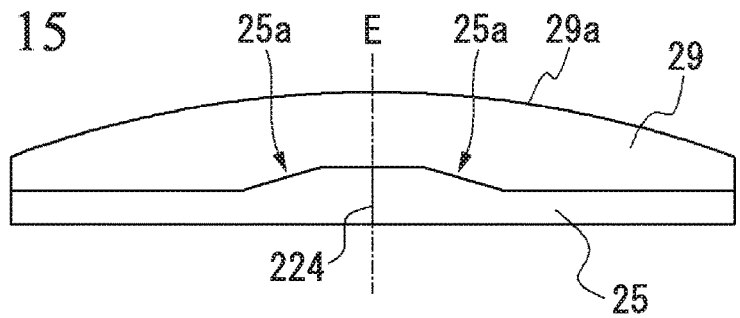
FIG. 15 is a cross-sectional view showing part of a non-pneumatic tire of an eighth embodiment of the present invention taken in the width direction of the tire.
Figure 16:
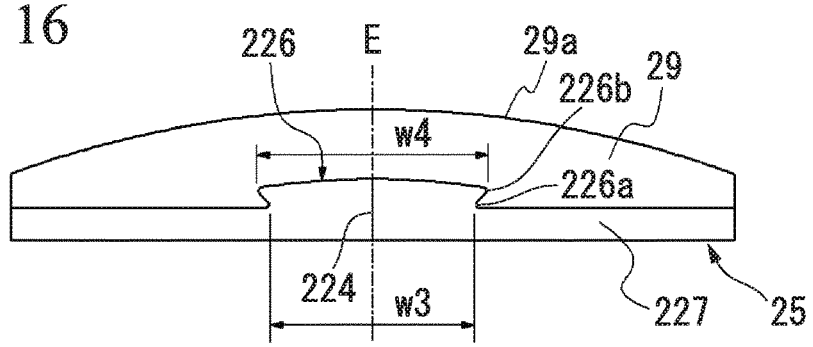
FIG. 16 is a cross-sectional view showing part of a non-pneumatic tire of a ninth embodiment of the present invention taken in the width direction of the tire.
Figure 17:
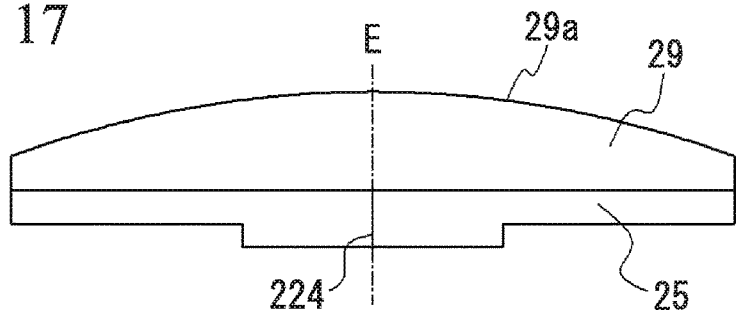
FIG. 17 is a cross-sectional view showing part of a non-pneumatic tire of a tenth embodiment of the present invention taken in the width direction of the tire.

FIGS. 15 to 17 are partial cross-sectional views showing non-pneumatic tires of eighth to tenth embodiments of the present invention taken in the tire width direction, respectively. In the non-pneumatic tire 21 of the present invention, as shown in FIG. 15, it is preferable that the thickness in the tire radial direction of at least part of the outer cylindrical body 25 gradually increase toward the center of the outer cylindrical body 25 in the tire width direction. In FIG. 15, the thickness in the tire radial direction of each of two parts 25a of the outer cylindrical body 25 gradually increases toward the center of the outer cylindrical body 25 in the tire width direction. According to this configuration, a process in which the tread portion 29 formed into a cylindrical shape beforehand is attached to the outside in the tire radial direction of the outer cylindrical body 25 can be easily performed. During running on road surface, detachment of the tread portion 29 from the outer cylindrical body 25 due to deformation of the tread portion 29 can be limited. That is, both of attachment with ease of the tread portion 29 to the outer cylindrical body 25 and prevention of detachment of the tread portion 29 from the outer cylindrical body 25 can be obtained.

In the non-pneumatic tire 21 of the present invention, as shown in FIG. 16, the outer cylindrical body 25 may include an outer cylindrical main body 227 and a projecting portion 226 projecting outward in the tire radial direction from the outer cylindrical main body 227. The projecting portion 226 includes a base part 226a connecting to the outer cylindrical main body 227 and an enlarged part 226b having a width w4 that is greater than the width w3 of the base part 226a in the tire width direction. According to this configuration, the projecting portion 226 of the outer cylindrical body 25 is engaged to the tread portion 29 having a recess whose shape corresponds to the projecting portion 226, whereby it is possible to reliably prevent the tread portion 29 from being broken off the outer cylindrical body 25.

As shown in FIG. 17, it is possible to increase the thickness of the outer cylindrical body 25 in the tire radial direction such that part of the outer cylindrical body 25 projects inward thereof in the tire radial direction. According to this configuration, a sufficient thickness of the tread portion 29 and improvement of the rigidity of the outer cylindrical body 25 can be reliably obtained. FIG. 18 is a partial cross-sectional view showing a cross-section of a conventional non-pneumatic tire in which the outline 39a of the outer surface of the tread portion 39 is flat in the tire width direction and the thickness of an outer cylindrical body 35 is constant.

The technical scope of the present invention is not limited to the above embodiments, and various modifications can be adopted within the scope of the present invention. For example, although the above embodiments show a configuration in which the connecting member 27 includes the first and second resilient connecting plates 221 and 222, instead of this configuration, a configuration may be adopted in which the connecting member 27 includes, in addition to the first and second resilient connecting plates 221 and 222, another connecting plate provided in a position different from the first and second resilient connecting plates 221 and 222 in the tire width direction.

Next, non-pneumatic tires of the present invention were experimentally manufactured, and the performances thereof were evaluated, and thus the results thereof are described below. For a practical example 6, a non-pneumatic tire including the tread portion 29 and the outer cylindrical body 25 shown in FIG. 13 was employed. For a practical example 7, a non-pneumatic tire including the tread portion 29 and the outer cylindrical body 25 shown in FIG. 14 was employed. For a comparative example, a non-pneumatic tire including the tread portion 39 and the outer cylindrical body 35 shown in FIG. 18 was employed. Each non-pneumatic tire of the practical examples 6 and 7 and the comparative example has the same structures as those of the tire shown in FIG. 1 other than the structures of the tread portions 29 and 39 and the outer cylindrical bodies 25 and 35, and the size of each non-pneumatic tire thereof is 3.00-8.

The ground contact performance with respect to road surface was evaluated by checking the steering stability based on feeling of a driver that drove a two-wheeled vehicle mounted with each tire on a test course.

The wear life was evaluated through the travel distance when a two-wheeled vehicle mounted with each tire ran at a speed of 30 km/h before the tire became non-usable due to wear of the tread portion.

The welding strength was evaluated through the distance when each tire ran on a drum-testing machine before the welded part of the tire was broken.

The results thereof are shown in the following table 2. Each evaluation is shown by an index when each result of the comparative example is 100. Each performance shows that the greater the numerical value is, the better.

TABLE 2

| | COMPARATIVE EXAMPLE | PRACTICAL EXAMPLE 6 | PRACTICAL EXAMPLE 7 |
| --- | --- | --- | --- |
| WEAR LIFE | 100 | 150 | 130 |
| STEERING STABILITY | 100 | 110 | 125 |
| WELDING STRENGTH | 100 | 100 | 120 |

According to the results shown in the table 2, it is understood that the ground contact performance and the wear life of each non-pneumatic tire of the practical examples 6 and 7 of the present invention are improved compared to those of the comparative example. In addition, it is understood that the welding strength of the non-pneumatic tire of the practical example 7 is improved compared to that of the comparative example.

A non-pneumatic tire including the tread portion 29 and the outer cylindrical body 25 shown in FIG. 15 was employed for a practical example 8, a non-pneumatic tire including the tread portion 29 and the outer cylindrical body 25 shown in FIG. 16 was employed for a practical example 9, a non-pneumatic tire including the tread portion 39 and the outer cylindrical body 35 shown in FIG. 18 was employed for a comparative example, and the adhesive strengths of these tread portions to these outer cylindrical bodies were evaluated. Each non-pneumatic tire of the practical examples 8 and 9 and the comparative example has the same structures as those of the tire shown in FIG. 1 other than the structures of the tread portions 29 and 39 and the outer cylindrical bodies 25 and 35, and the size of each non-pneumatic tire thereof is 3.00-8.

The adhesive strength was evaluated through the distance when each tire ran on a dram-testing machine with a slip angle before the tread portion was broken off the tire.

TABLE 3

| | COMPARATIVE EXAMPLE | PRACTICAL EXAMPLE 8 | PRACTICAL EXAMPLE 9 |
|---|---|---|---|
| ADHESIVE STRENGTH | 100 | 130 | 140 |

According to the results shown in the above table 3, it is understood that the adhesive strength of the tread portion of each non-pneumatic tire of the practical examples 8 and 9 of the present invention is improved compared to that of the comparative example.

Hereinbefore, although suitable embodiments for the present invention are described with reference to the attached drawings, the present invention is not limited to the above embodiments. The shape, the combination or the like of each component shown in the above embodiments is an example, and various modifications can be adopted according to a design request or the like within the scope of the present invention. In addition, the above embodiments and modifications may be appropriately combined together.

The surface of the tread portion of the present invention may be provided with various uneven parts, projections or grooves in order to improve the grip property (friction coefficient) with respect to road surface and the drainability although the shapes thereof are omitted from the drawings of the above embodiments and modifications. Even when the uneven parts or the like are provided therein, it is sufficient that the outline of the entire surface of the tread portion is a curved line bulging outward in the tire radial direction.

DESCRIPTION OF REFERENCE SIGNS 11, 11A, 12, 13, 14, 15, 21 non-pneumatic tire
23, 111 mount body
25 outer cylindrical body
27, 115 connecting member
29 tread portion
29a, 116c outer surface
113 ring-shaped body (outer cylindrical body)
113a maximum outer diameter part
116 tread member (tread portion)
116a maximum outer diameter part
116b outer circumferential surface
121 first connecting plate (first connecting member)
122 second connecting plate (second connecting member)
123 first divided ring-shaped body (first cylindrical body)
124 second divided ring-shaped body (second cylindrical body)
123a, 124a division surface
129, 225 central area
130 shoulder part
217 first outer cylindrical body (first cylindrical body)
218 second outer cylindrical body (second cylindrical body)
221 first resilient connecting plate (first connecting member)
222 second resilient connecting plate (second connecting member)
226 projecting portion
226a base part
226b enlarged part
227 outer cylindrical main body
H tire width direction
E tire equator
S axle (shaft)
O axial line

The invention claimed is:

1. A non-pneumatic tire, comprising:
a mount body that is mounted on a shaft;
an outer cylindrical body encircling the mount body from outside of the mount body in a radial direction of the tire;
connecting members arranged in a circumferential direction of the tire between the mount body and the outer cylindrical body and connecting the mount body and the outer cylindrical body such that the mount body and the outer cylindrical body are resiliently movable relative to each other; and
a cylindrical tread portion encircling the outer cylindrical body from outside of the outer cylindrical body in the radial direction of the tire;
wherein the outline of a cross-section of an outer surface of a central area of the tread portion taken in a width direction of the tire is a curved line bulging outward in the radial direction of the tire, and the central area includes at least a tire equator, and
wherein the outer cylindrical body includes an outer cylindrical main body and a projecting portion projecting outward in the radial direction of the tire from the outer cylindrical main body, and
the projecting portion includes a base part connecting to the outer cylindrical main body and an enlarged part whose cross-section taken in the width direction of the tire has a greater width than the width of the base part in the width direction of the tire.

2. The non-pneumatic tire according to claim 1,
wherein an outer circumferential surface of the tread portion is formed into a curved surface whose cross-section taken in the width direction of the tire bulges outward in the radial direction of the tire,
wherein the outer diameter of the tread portion gradually decreases from a maximum outer diameter part of the tread portion to each of two ends of the tread portion in the width direction of the tire between which the maximum outer diameter part is disposed, and
wherein the thickness of the central area of the tread portion in the radial direction of the tire is greater than the thickness of a shoulder part of the tread portion positioned outside of the central area in the width direction of the tire.

3. The non-pneumatic tire according to claim 2,
wherein the outer diameter of the outer cylindrical body becomes the maximum at the same position as the maximum outer diameter part of the tread portion in the width direction of the tire and gradually decreases from the position to each of two ends of the outer cylindrical body in the width direction of the tire between which the position is disposed.

4. The non-pneumatic tire according to claim 3,
wherein the thickness of the outer cylindrical body in the radial direction of the tire gradually increases toward a maximum outer diameter part of the outer cylindrical body in the width direction of the tire, and
wherein the connecting members are connected to positions of the outer cylindrical body different from the maximum outer diameter part of the outer cylindrical body in the width direction of the tire.

5. The non-pneumatic tire according to claim 3,
wherein the outer cylindrical body is divided in the width direction of the tire at the maximum outer diameter part having the maximum diameter of the outer cylindrical body,
wherein the thickness of the outer cylindrical body in the radial direction of the tire gradually increases toward a divided part of the outer cylindrical body in the width direction of the tire, and
wherein two division surfaces at the divided part are connected to each other.

6. The non-pneumatic tire according to claim 1,
wherein the outer cylindrical body is divided into a first cylindrical body and a second cylindrical body, the first cylindrical body is positioned to be close to a first area next to the tire in the width direction of the tire, and the second cylindrical body is positioned to be close to a second area next to the tire opposite to the first area in the width direction of the tire, and
wherein the thickness of a joined part in the radial direction of the tire, the joined part being between the first and second cylindrical bodies, is greater than the average thickness of the outer cylindrical body in the radial direction of the tire.

7. The non-pneumatic tire according to claim 6,
wherein the thickness of at least part of the outer cylindrical body in the radial direction of the tire gradually increases toward the center of the outer cylindrical body in the width direction of the tire.

8. The non-pneumatic tire according to claim 1,
wherein a connecting member of the connecting members includes a first connecting member and a second connecting member that are disposed to be separated from each other in the width direction of the tire, and
wherein the thickness of the outer cylindrical body in the radial direction of the tire within a tire width-direction area that is between the first and second connecting members is greater than the average thickness of the outer cylindrical body in the radial direction of the tire.

* * * * *